US009075338B2

(12) United States Patent
Shoji et al.

(10) Patent No.: US 9,075,338 B2
(45) Date of Patent: Jul. 7, 2015

(54) IMAGE FORMING APPARATUS

(71) Applicant: CANON KABUSHIKI KAISHA, Tokyo (JP)

(72) Inventors: Ryuhei Shoji, Mishima (JP); Hirotaka Shiomichi, Suntou-gun (JP); Jun Haruna, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/910,833

(22) Filed: Jun. 5, 2013

(65) Prior Publication Data

US 2013/0328987 A1 Dec. 12, 2013

(30) Foreign Application Priority Data

Jun. 8, 2012 (JP) ................................. 2012-131290
May 9, 2013 (JP) ................................. 2013-099736

(51) Int. Cl.

| | |
|---|---|
| ***B41J 2/47*** | (2006.01) |
| ***G03G 15/043*** | (2006.01) |
| ***G03G 15/01*** | (2006.01) |
| ***G03G 15/04*** | (2006.01) |
| ***G03G 15/00*** | (2006.01) |
| *G02B 26/08* | (2006.01) |
| *G02B 26/10* | (2006.01) |
| *G02B 26/12* | (2006.01) |
| *H04N 1/46* | (2006.01) |

(52) U.S. Cl.

CPC .......... *G03G 15/043* (2013.01); *G03G 15/0189* (2013.01); *G03G 15/04072* (2013.01); *G03G 15/50* (2013.01)

(58) Field of Classification Search

CPC ............ H04N 1/4005; H04N 1/40037; G03G 15/326; G06K 15/128; G06K 15/1209

USPC ................ 347/253; 359/201.1, 212.1–212.2, 359/216.1, 217.1–217.4, 218.1, 219.1; 358/505

See application file for complete search history.

(56) References Cited

U.S. PATENT DOCUMENTS 5,740,502 A * 4/1998 Kobayashi et al. ........... 399/128
5,900,901 A 5/1999 Costanza et al.
6,137,522 A * 10/2000 Melino et al. ................ 347/233

(Continued)

FOREIGN PATENT DOCUMENTS

JP H08-337007 A 12/1996
JP 2001-281944 A 10/2001

(Continued)

OTHER PUBLICATIONS

U.S. Appl. No. 13/910,854, Jun. 5, 2013, Masahiro Hayakawa.

*Primary Examiner* — Jannelle M LeBron
*Assistant Examiner* — Jeremy Bishop
(74) *Attorney, Agent, or Firm* — Canon USA INC IP Division

(57) ABSTRACT

An image forming apparatus includes a control unit. The control unit is capable of executing a first mode for forming a toner image on the photosensitive member that rotates at a first speed and a second mode for forming a toner image on the photosensitive member that rotates at a second speed slower than the first speed, and the control unit causes the light illumination unit to perform the weak exposure in the first mode without thinning the scanning surface of the deflection scanning unit and perform the weak exposure in the second mode while thinning the scanning surface of the deflection scanning unit.

19 Claims, 15 Drawing Sheets

(56) References Cited

U.S. PATENT DOCUMENTS

| | | | | |
|---|---|---|---|---|
| 6,188,419 | B1 * | 2/2001 | Katamoto et al. | 347/129 |
| 6,226,019 | B1 | 5/2001 | Nakano | |
| 6,501,493 | B2 * | 12/2002 | Fujimoto et al. | 347/116 |
| 6,606,470 | B1 * | 8/2003 | Wibbels et al. | 399/156 |
| 8,120,825 | B2 * | 2/2012 | Akamatsu | 358/505 |
| 8,493,425 | B2 | 7/2013 | Furuta | |
| 2008/0122918 | A1 | 5/2008 | Sakai et al. | |
| 2008/0175608 | A1 | 7/2008 | Kobashigawa | |
| 2012/0147119 | A1 | 6/2012 | Toyoizumi | |
| 2012/0230705 | A1 | 9/2012 | Hasegawa et al. | |
| 2012/0300009 | A1 | 11/2012 | Toyoizumi et al. | |

FOREIGN PATENT DOCUMENTS

| | | | |
|---|---|---|---|
| JP | 2006-39026 | A | 2/2006 |
| JP | 2008-134326 | A | 6/2008 |
| JP | 2008-181101 | A | 8/2008 |
| JP | 2009-255534 | A | 11/2009 |

* cited by examiner

IMAGE FORMING APPARATUS

BACKGROUND OF THE INVENTION

1. Field of the Invention

The present disclosure relates to an image forming apparatus, such as a laser printer, a copying machine, or a fax machine, employing the electrophotographic recording method.

2. Description of the Related Art

Conventionally, there are known image forming apparatuses, such as copying machines and laser printers, employing the electrophotographic recording method. An image forming apparatus employing the electrophotographic recording method performs the following electrophotographic processes as discussed in Japanese Patent Application Laid-Open No. 2001-281944. First, a surface of a photosensitive drum is evenly charged to, for example, −600V by a charging device. Then, a laser exposure apparatus emits a laser beam onto the photosensitive drum, and an electrostatic latent image is formed on the photosensitive drum. Further, toner is attached to the electrostatic latent image by a development apparatus. The toner image is transferred onto a recording medium by a transfer apparatus.

The toner that remains on the photosensitive drum is removed by a drum cleaning unit. Further, the remaining electric potential of the photosensitive drum is neutralized by illumination of a pre-exposure lamp. Then, the photosensitive drum is ready for the next image forming.

In forming an electrostatic latent image on the photosensitive drum surface of the image forming apparatus employing the above-described electrophotographic method, it is important to control the charge potential of the surface of the photosensitive drum in advance. Various control methods are proposed for this control of the charge potential including the above-described pre-exposure lamp. However, a simplified configuration is desired from the viewpoint of cost reduction and downsizing of the apparatus main body.

On the other hand, in recent years, color printers have been widely used and have become to be the main stream of the printers. These color printers are capable of changing processing speeds so as to deal with printing of various types of media including rough paper and glossy paper as well as plain paper. In addition, color printers are not only used for producing color prints, but also produces monochromatic prints as well. When a color printer performs monochromatic printing, it also changes the processing speed. Since the printer needs to correspond to various processing speeds, operation and control of the printer tend to be complicated.

SUMMARY OF THE INVENTION

An embodiment of the present invention is directed to a technique for appropriately controlling charge potential of each photosensitive member by a simplified configuration while dealing with different process speed conditions.

According to an aspect of the present invention, an image forming apparatus includes a photosensitive member, a light illumination unit which includes a light emitting element and a deflection scanning unit and is configured to reflect light emitted from the light emitting element from a scanning surface of the deflection scanning unit such that the photosensitive member which is charged is illuminated, a development unit configured to form a toner image by attaching toner to a latent image formed on the photosensitive member illuminated by the light illumination unit, and a control unit configured to cause the light illumination unit to perform normal exposure of a first exposure amount such that the toner is attached to an imaging portion to which the toner is to be attached on the photosensitive member and cause the light illumination unit to perform weak exposure of a second exposure amount smaller than the first exposure amount such that the toner is not attached to a non-image portion to which the toner is not to be attached on the photosensitive member, wherein the control unit is capable of executing a first mode for forming a toner image on the photosensitive member that rotates at a first speed and a second mode for forming a toner image on the photosensitive member that rotates at a second speed slower than the first speed, and wherein the control unit causes the light illumination unit to perform the weak exposure in the first mode without thinning the scanning surface of the deflection scanning unit and perform the weak exposure in the second mode while thinning the scanning surface of the deflection scanning unit.

According to another aspect of the present invention, an image forming apparatus includes a photosensitive member, a light illumination unit which includes a light emitting element and a deflection scanning unit and is configured to reflect light emitted from the light emitting element from a scanning surface of the deflection scanning unit such that the photosensitive member which is charged is illuminated, a development unit configured to form a toner image by attaching toner to a latent image formed on the photosensitive member illuminated by the light illumination unit, and a control unit configured to cause the light illumination unit to perform normal exposure of a first exposure amount such that the toner is attached to an imaging portion to which the toner is to be attached on the photosensitive member and cause the light illumination unit to perform weak exposure of a second exposure amount smaller than the first exposure amount such that the toner is not attached to a non-image portion to which the toner is not to be attached on the photosensitive member, wherein the control unit causes the light illumination unit to perform the normal exposure without thinning the scanning surface of the deflection scanning unit and perform the weak exposure while thinning the scanning surface of the deflection scanning unit.

Further features of the present invention will become apparent from the following description of exemplary embodiments with reference to the attached drawings.

DESCRIPTION OF THE EMBODIMENTS

Exemplary embodiments of the present invention are described below. The exemplary embodiments described below will help to understand various concepts including superordinate, intermediate, and subordinate concepts. The technical scope of the present invention is defined by the patent claims, and is not limited by the individual embodiments described below.

Figure 1:
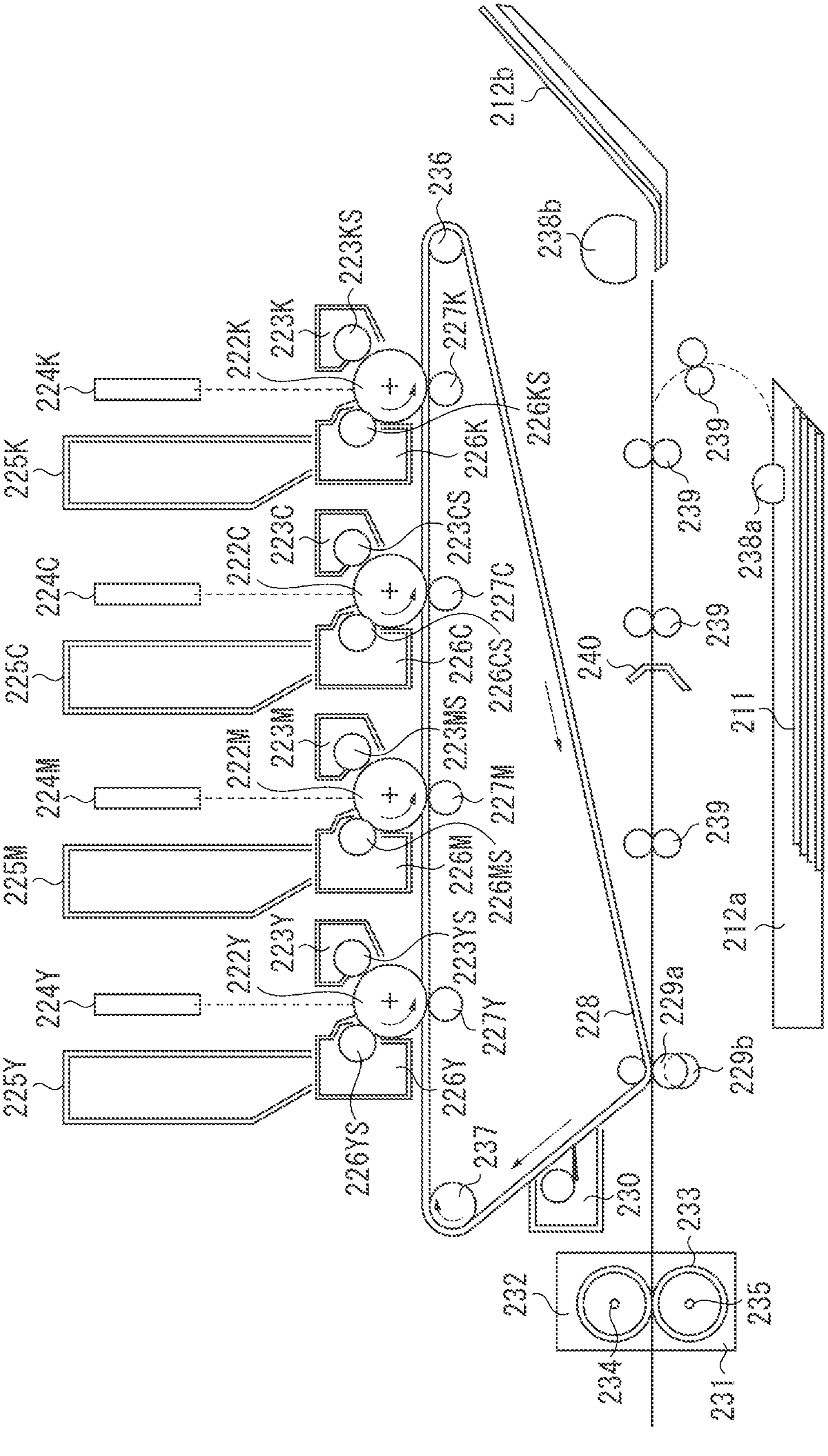
FIG. 1 is a schematic cross-sectional view of an image forming apparatus.

FIG. 1 is an example of a cross sectional drawing of a tandem color image forming apparatus employing intermediate transfer members. The tandem color image forming apparatus is an example of a color image forming apparatus employing the electrophotographic method according to a first exemplary embodiment of the present invention. The color image forming apparatus includes image forming units of four colors, which are yellow Y, magenta M, cyan C, and black K.

<Configuration of Image Forming Apparatus>

The configuration and entire operation of the color image forming apparatus employing the electrophotographic method will be described with reference to FIG. 1. A recording material 211 is stored in a sheet cassette 212*a*. A paper feeding tray 212*b* also stores the recording material 211 similar to the sheet cassette 212*a*. Injection charging devices 223Y, 223M, 223C, and 223K (Y, M, C, and K indicate units for yellow, magenta, cyan, and black) respectively charge photosensitive drums 222Y, 222M, 222C, and 222K on which electrostatic latent images are formed. Laser scanners 224Y, 224M, 224C, and 224K form electrostatic latent images. Toner containers 225Y, 225M, 225C, and 225K contain toner. Toner of each color is provided from each of the toner containers to a corresponding developing device. The developing devices 226Y, 226M, 226C, and 226K visualize electrostatic latent images as toner images.

An intermediate transfer member 228 is a member to hold a transferred toner image. The intermediate transfer member 228 is supported by a drive roller 237 which transmits the drive to the intermediate transfer member 228 and a driven roller 236 which rotates according to the rotation of the intermediate transfer member 228. Each of primary transfer rollers 227Y, 227M, 227C, and 227K transfers a toner image onto the intermediate transfer member 228. Secondary transfer roller 229*a* transfers a toner image transferred onto the intermediate transfer member 228 to the recording material 211. A cleaning unit 230 cleans the toner that remains on the intermediate transfer member 228.

A fixing unit 231 fixes a toner image to the recording material 211. The fixing unit 231 includes a fixing roller 232, a pressure roller 233 which presses the recording material 211 against the fixing roller 232, and heaters 234 and 235 which apply heat to the fixing roller 232 and the pressure roller 233, respectively. Paper feeding rollers 238*a* and 238*b* feed the recording material 211. A pair of conveyance rollers 239 pinches and conveys the recording material 211 to the secondary transfer roller 229*a*. A conveyance sensor 240 detects passage of the recording material 211.

Each of the laser scanners 224Y, 224M, 224C, and 224K directs an exposure light beam emitted from a light emitting element, such as a laser diode, for a period of time corresponding to an exposure time of an exposure control unit which will be described below with reference to FIG. 1. Accordingly, an electrostatic latent image is formed. When the electrostatic latent image is developed, a single color toner image is formed. Each of the single color toner images of four colors is superimposed on the intermediate transfer member 228. Accordingly, a multicolor toner image is formed. Then, the multicolor toner image is transferred onto the recording material 211, and the multicolor toner image on the recording material is fixed.

A charge unit as a charging means includes the injection charging devices 223Y, 223M, 223C, and 223K that charge the photosensitive drums 222Y, 222M, 222C, and 222K for yellow Y, magenta M, cyan C, and black K stations, respectively. The injection charging devices 223Y, 223M, 223C, and 223K include charge rollers 223YS, 223MS, 223CS, and 223KS, respectively.

Each of the photosensitive drums 222Y, 222M, 222C, and 222K is an aluminum cylinder having an organic photoconductive layer applied on the outer surface. The photosensitive drums 222Y, 222M, 222C, and 222K rotate counterclockwise by a drive force transmitted from a drive motor (not illustrated) according to the image forming operation.

The laser scanners 224Y, 224M, 224C, and 224K as exposure means (light illumination unit) directs light beams onto the respective photosensitive drums 222Y, 222M, 222C, and 222K, and selectively illuminates the respective surfaces of the photosensitive drums 222Y, 222M, 222C, and 222K so that an electrostatic latent images are formed.

A development unit as developing means includes the four developing devices 226Y, 226M, 226C, and 226K for each station. The developing devices 226Y, 226M, 226C, and 226K develop images corresponding to yellow Y, magenta M, cyan C, and black K so that each electrostatic latent image formed on each photosensitive drum is visualized. The developing devices 226Y, 226M, 226C, and 226K include developing rollers 226YS, 226MS, 226CS, 226KS, respectively. Each of the developing devices is removable.

A transferring unit as transfer means applies an appropriate bias voltage to the primary transfer rollers 227Y, 227M, 227C, and 227K and efficiently transfers single color toner images onto the intermediate transfer member 228 by setting different rotation speeds for the photosensitive drums 222Y, 222M, 222C, and 222K and the intermediate transfer member 228. This transfer process is referred to as primary transfer. The drive roller 237 rotates clockwise by a driving force transmitted from a drive motor (not illustrated).

Further, the transferring unit as the transfer means superimposes the single color toner images on one after another on the intermediate transfer member 228 for each station. The superimposed multicolor toner image is conveyed to the secondary transfer roller 229*a* by the rotation of the intermediate transfer member 228. In the meantime, the recording material 211 is conveyed from the sheet cassette 212*a* by the paper feeding roller 238*a* and further pinched and conveyed to the secondary transfer roller 229*a* by a group of rollers including pairs of conveyance rollers 239. At the secondary transfer roller 229*a*, a multicolor toner image on the intermediate transfer member 228 is transferred onto the recording material 211. An appropriate bias voltage is applied to the secondary transfer roller 229*a*, so that the multicolor toner image is electrostatically transferred onto the recording material 211. This transfer process is referred to as secondary transfer.

The secondary transfer roller 229*a* contacts the recording material 211 at a position drawn with the continuous line in FIG. 1 while the multicolor toner image is being transferred onto the recording material 211. When the print processing is finished, the secondary transfer roller moves to a position 229*b* drawn with the dashed line in FIG. 1. The recording material 211 can be set on the paper feeding tray 212*b* instead of the sheet cassette 212*a*. In this case, the recording material 211 is fed from the paper feeding tray 212*b* by the paper feeding roller 238*b* and further pinched and conveyed to the secondary transfer roller 229*a* by the group of rollers including the pairs of conveyance rollers 239. Whether the recording material 211 is conveyed at desired timing is detected by the conveyance sensor 240. If the recording material 211 is not conveyed at the desired timing, various errors (for example, a sheet conveyance delay jam) are notified to a video controller (not illustrated) or the like.

The fixing unit 231 as fixing means includes the fixing roller 232 which applies heat to the recording material 211 and the pressure roller 233 which presses the recording material 211 against the fixing roller 232, so that the multicolor toner image transferred onto the recording material 211 is fixed to the recording material 211.

The fixing roller 232 and the pressure roller 233 are hollow rollers and respectively include the heaters 234 and 235 therein. The fixing unit 231 causes the fixing roller 232 and the pressure roller 233 to convey the recording material 211 onto which the multicolor toner image is transferred and applies heat and pressure there to fix the toner onto the recording material 211. The recording material 211 after the toner is fixed thereto is discharged on a discharge tray (not illustrated) by a discharge roller (not illustrated), and then the image forming operation ends.

The cleaning unit 230 cleans the toner that remains on the intermediate transfer member 228. Waste toner that remains after the multicolor toner image of four colors formed on the intermediate transfer member 228 is transferred onto the recording material 211 is collected in a cleaner container (not illustrated).

<Description of Laser Scanner Unit>

Figure 2:
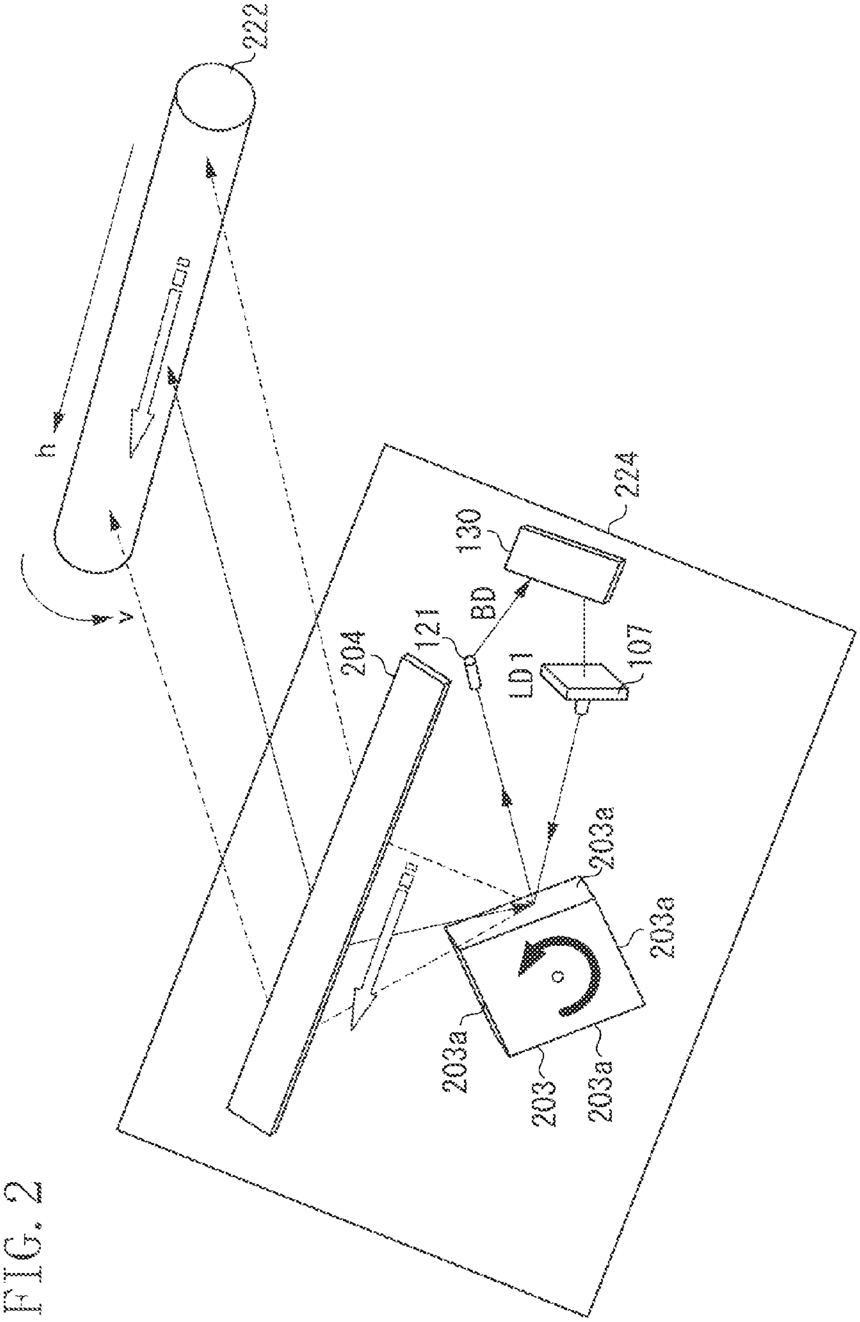
FIG. 2 illustrates an optical scanning device (i.e. a laser scanner).

FIG. 2 is an illustration of the laser scanner 224 to which an embodiment of the present invention can be applied. A laser diode (LD) 107 is a semiconductor laser which is a light emitting element that emits a laser beam. A polygonal mirror 203 is a rotating polygonal mirror which includes a number of scanning surfaces (mirror surfaces) 203*a* and rotates about a rotational axis. The polygonal mirror 203 rotates in the direction indicated by an arrow in FIG. 2 at a uniform rate by drive of a motor (not illustrated) and reflects a laser beam emitted from the LD 107 to perform deflection scanning.

A beam detection (BD) sensor 121 detects a laser beam reflected by the polygonal mirror. A scanning mirror 204 reflects the laser beam scanned by the polygonal mirror 203 so that the reflected laser beam laterally scans the photosensitive drum 222 from right to left as indicated by an outline arrow in FIG. 2. Actually, on the light path in between the polygonal mirror 203 and the scanning mirror 204, the laser beam passes through various lenses provided for causing the laser beam to scan the photosensitive drum at a constant speed.

A laser drive system circuit 130 supplies a drive current to the LD 107 based on a control signal and a video data signal, which are not illustrated. According to the present exemplary embodiment, a current is supplied to the LD 107 and an electrostatic latent image is formed on the photosensitive drum 222 with reference to a timing signal (hereinbelow, referred to as a BD signal) output from the BD sensor 121 in FIG. 2.

<Description of Printing System>

Figure 3:
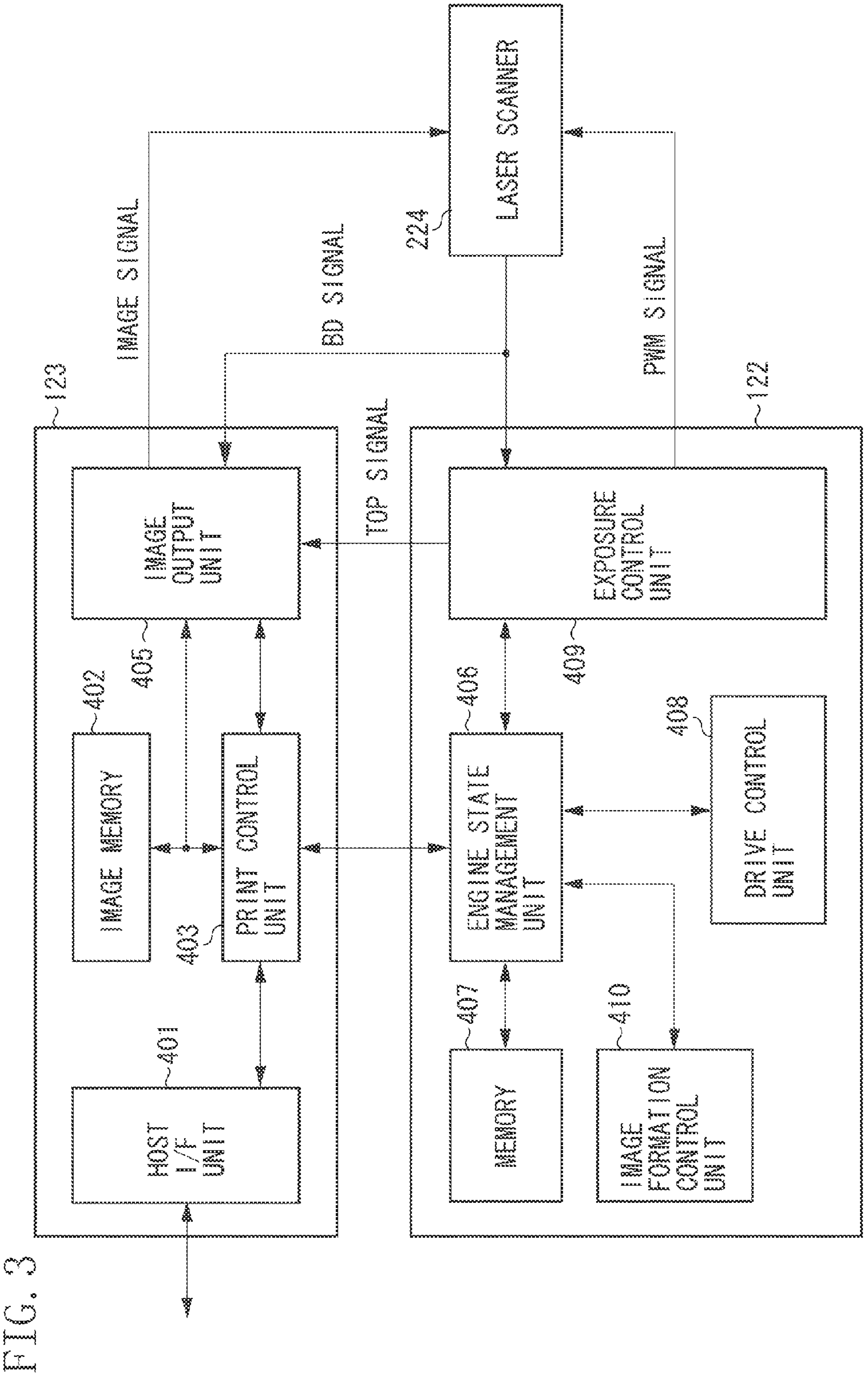
FIG. 3 is a block diagram of a control unit of the image forming apparatus.

FIG. 3 is a block diagram illustrating a control unit and operations according to an embodiment of the present invention. A video controller (image controller) 123 is an integrated circuit (IC) such as a one-chip microcomputer, or the like. The video controller 123 manages a print request and image data output from a host computer, such as a personal computer (PC). A host interface (I/F) unit 401 included in the video controller 123 controls communication between the printer and the PC.

An image memory 402 temporarily stores image data to be printed. An image output unit 405 converts the image data into data which is printable by a printer engine and outputs the converted data according to a predetermined timing. A print control unit 403 controls and manages various types of data stored in the video controller 123.

A memory 407 stores parameters necessary for the control of the operations of the engine. An image formation control unit 410 controls a high voltage output unit in the engine, the fixing unit 231, and the like. A drive control unit 408 controls the drive of an actuator of a motor or the like. An exposure control unit 409 controls the light emission of the laser scanner 224 and the output timing of the image data. An engine state management unit 406 transmits operational instructions to each control unit when it receives a print request from the video controller 123. An engine controller 122 is an IC such as a one-chip microcomputer in which the above-described functions are installed.

Various types of information pieces related to the printer system are exchanged between the print control unit 403 and the engine state management unit 406 via a communication I/F. The information includes a print request, abnormality detection, presence/absence of thinned image formation, an image output scanning surface when thinned latent image formation is performed, and so on. The exposure control unit 409 synchronizes a timing of the laser scanner control by transmitting to the image output unit 405, a/TOP signal which is a writing timing signal with respect to page printing.

Upon receiving a print request from the PC, the print control unit 403 temporary stores the image data to be printed in the image memory 402 and outputs a print request to the engine controller 122. The video controller 123 converts the image data temporary stored in the image memory 402 into raster data that matches an output format of the laser scanner 224 and prepares for the image output. When the engine controller 122 receives the print request transmitted from the video controller 123, the engine controller 122 instructs the drive control unit 408 to start driving a motor (not illustrated) and prepares for the image forming.

When the preparation of the image forming is completed, the exposure control unit 409 performs the laser light emission and simultaneously notifies the video controller 123 that the image output is to be started. In this manner, an electrostatic latent image is formed on the photosensitive drum, and the toner is developed by the developing device. Then, the primary transfer and the secondary transfer described with reference to FIG. 1 are sequentially performed. In FIG. 1, the image forming is performed in the order of Y, M, C, and K.

According to the present exemplary embodiment, each of the engine controller 122 and the video controller 123 is an independent IC. However, a single IC having the functions of these two controllers, such as a System-On-Chip (SOC) or a System-In-Package (SIP), may also be used. Further, according to the present exemplary embodiment, although the image memory 402 and the memory 407 are integrated in an IC, an external memory IC can also be used. Further, if an external memory IC is used, it can be shared by the video controller 123 and the engine controller 122.

<Image Output Unit According to the First Exemplary Embodiment>

Next, the image output unit 405 described with reference to FIG. 3 will be described in detail below with reference to FIG.

4. A print image data control unit 301 controls and manages data to be printed. A weak light emission data control unit 303 controls and manages a control parameter of weak light emission. A print image exposure pulse generation unit 304 generates an exposure pulse for printing image based on the print image data output from the print image data control unit 301. A weak light emission exposure pulse generation unit 306 generates an exposure pulse for weak light emission based on the weak light emission data output from the weak light emission data control unit 303.

Figure 4:
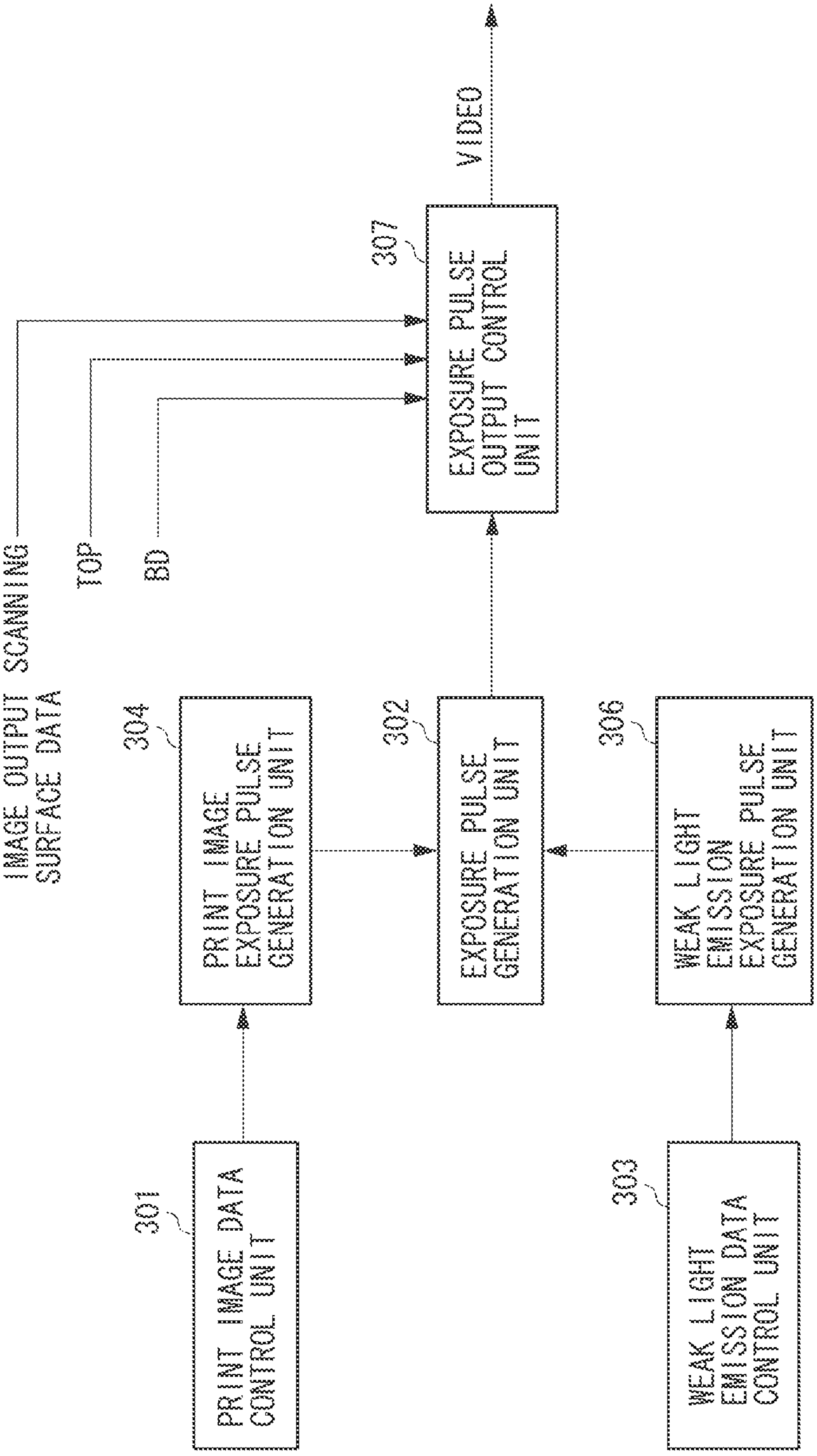
FIG. 4 illustrates details of an image output unit.

An exposure pulse generation unit 302 performs the OR operation on the exposure pulse output from the print image exposure pulse generation unit 304 and the exposure pulse output from the weak light emission exposure pulse generation unit 306 and reproduces an exposure pulse. An exposure pulse output control unit 307 determines an output timing of the exposure pulse based on the BD signal transmitted from the laser scanner 224, the TOP signal and image output scanning surface data transmitted from the engine controller 122. Based on the determined output timing, the exposure pulse output control unit 307 transmits an exposure pulse signal (VIDEO signal in FIG. 4) to the laser scanner 224.

According to the present exemplary embodiment, as described above, by performing the OR operation on the exposure pulse for weak light emission and the exposure pulse for printing image, the laser scanner 224 normally emits the light beam, based on the exposure pulse for printing image, to an imaging portion to which the toner is attached of the photosensitive drum 222 in an effective area which is an image formable area of the photosensitive drum 222. According to the normal light emission, the imaging portion of the photosensitive drum 222 is exposed to an amount of light of the normal exposure (first exposure amount). Accordingly, the electric potential on the photosensitive drum 222 (photosensitive member) is controlled to such a potential that an amount of toner that matches for an image density is attached to the photosensitive drum 222.

In addition, a non-image portion on the photosensitive drum 222 is subjected to weak light emission based on the exposure pulse for weak light emission. The non-image portion is a portion on the photosensitive drum 222 where the toner is not to be attached to. According to the weak light emission, the non-image portion of the photosensitive drum 222 is exposed to an amount of light of weak exposure (a second exposure amount). Accordingly, the electric potential on the photosensitive drum 222 (photosensitive member) is controlled to such a potential that no toner is attached to the photosensitive drum 222.

The weak light emission is used for adjusting the electric potential of the non-image portion to an appropriate value after the charge of the photosensitive drum 222 so as to prevent occurrence of defective images due to toner attachment, such as fog or reversed fog. More specifically, an electric potential Vd of the drum after the charge is set to −700 V to −600 V whereas a development potential Vdc is set to −350V. The amount of light emission of the weak light emission is set so that a drum electric potential Vd_bg will be −550 V to −400 V by the weak exposure. Further, the amount of light emission of the normal light emission is set so that a drum electric potential Vl will be −150 Vby the normal exposure.

A width of the exposure pulse for weak light emission is narrower than that of the exposure pulse for printing image. By setting a narrower pulse width, an amount of the driving current that flows through the LD 107 is controlled and the light-emission intensity of the laser beam is reduced compared to the light-emission intensity of the laser beam for image output.

Since the scanning surface for weak light emission is determined based on the image output scanning surface data transmitted from the engine controller 122, unnecessary emission of weak light to a thinned scanning surface can be prevented. Thinning means not to direct a laser beam to one or more sequentially adjacent mirror surfaces after a mirror surface (scanning surface) of the polygonal mirror 203 is illuminated by a laser beam. In other words, When the thinning is performed, not all scanning surfaces are used for laser scanning in one rotation of the polygonal mirror 203, but scanning surfaces are used at a predetermined rate. For instance, when every other scanning surface is used for laser scanning, scanning surfaces are alternately thinned.

The thinned scanning surface is the mirror surface of the polygonal mirror 203 which is to be thinned out. According to the thinning operation, a light emission interval of each main scanning line by the LD 107 can be controlled. Details of the thinning operation will be described in detail below.

<Laser Drive System Circuit According to the First Exemplary Embodiment>

Figure 5:
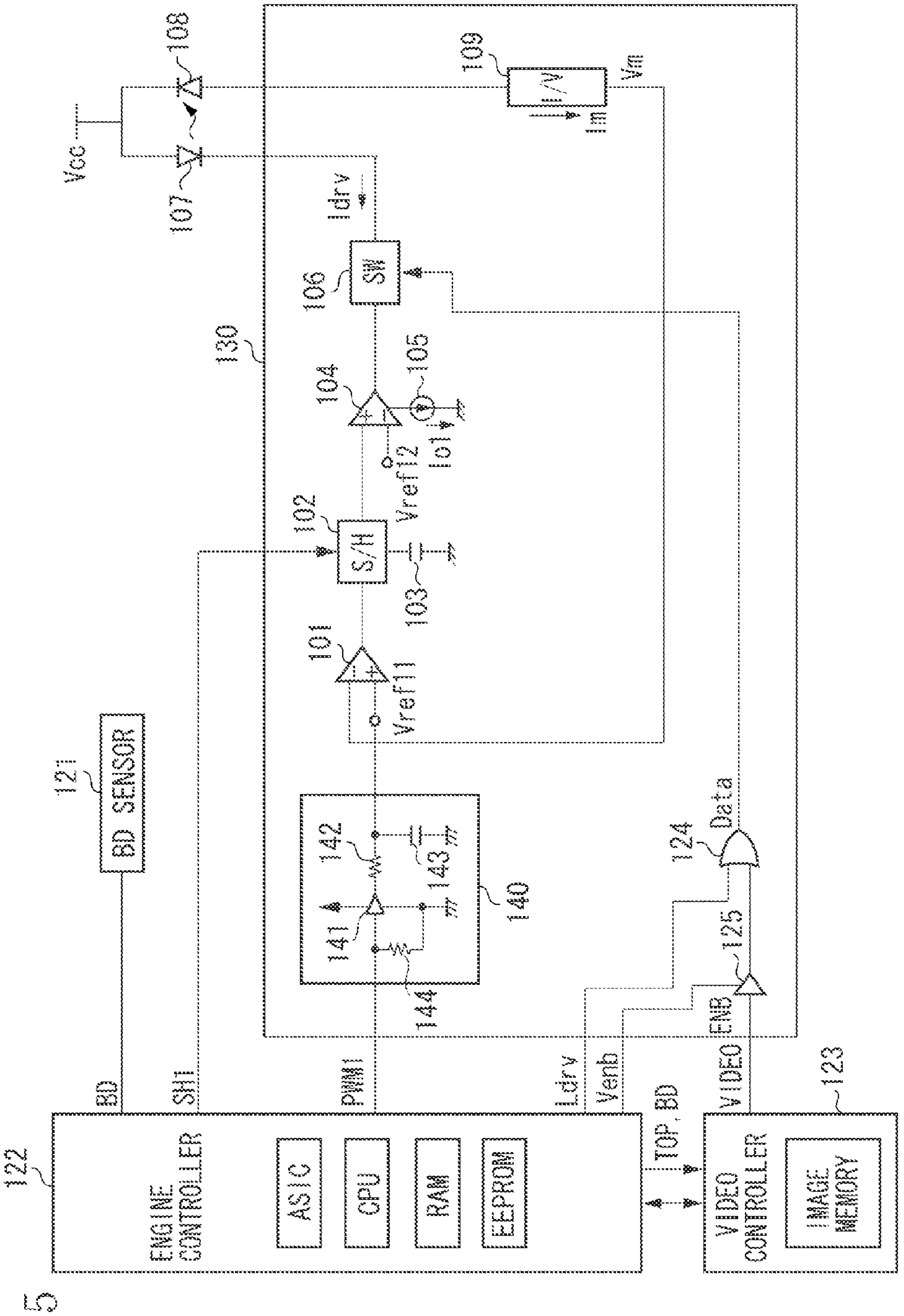
FIG. 5 illustrates a laser drive system circuit.

Next, the laser drive system circuit 130 will be described with reference to FIG. 5. In FIG. 5, the laser drive system circuit 130, which is illustrated in FIG. 2, corresponds to a circuit enclosed by a solid line. The laser drive system circuit 130 includes a comparator circuit 101, a sample and hold circuit 102, a hold capacitor 103, a current amplification circuit 104, a reference current source (constant current circuit) 105, and a switching circuit 106.

Further, a detection side of the laser drive system circuit 130 includes the LD 107, a photodiode 108, a current-voltage conversion circuit 109, and a synchronization detection signal element (BD sensor) 121.

A circuit 140 generates a reference voltage for determining the laser drive current which is used when a latent image is formed according to a pulse width modulation (PWM) signal PWM1 output from the exposure control unit 409 of the engine controller 122. The circuit 140 includes a protective resistor 144, an inverter 141, and smoothing filters 142 and 143. The duty of the signal PWM1 is determined in advance and the duty information is stored in the memory 407 in the engine controller 122. When a latent image is formed, a pulse signal of the above-described predetermined duty is to be continuously output as the signal PWM1. In the following descriptions, the photodiode 108 is referred to as the PD 108.

A Ldrv signal output from the engine controller 122 and a VIDEO signal output from the video controller 123 are input to the input terminals of an OR circuit 124. An output signal DATA is input to the switching circuit 106 described below. The VIDEO signal is output from the image output unit 405 of the video controller 123.

The VIDEO signal output from the video controller 123 is input in a buffer 125 having an enable terminal. The output of the buffer 125 is connected to the above-described OR circuit 124. Further, a Venb signal output from the engine controller 122 is input to the enable terminal. The engine controller 122 outputs an SH1 signal, the Ldrv signal, and the Venb signal described below.

A reference voltage Vref11 is applied to a positive terminal of the comparator circuit 101. An output terminal of the comparator circuit 101 is connected to the sample and hold circuit 102. The reference voltage Vref11 is a target voltage of the LD 107 to emit light beams at a light emission level for normal printing. The hold capacitor 103 is connected to the sample and hold circuit 102. An output of the hold capacitor 103 is input to a positive terminal of the current amplification circuit 104.

The reference current source 105 is connected to the current amplification circuit 104. An output of the current amplification circuit 104 is input to the switching circuit 106. On the other hand, a second reference voltage Vref12 is connected to a negative terminal of the current amplification circuit 104. A current Io1 is determined based on a difference between the output voltage of the sample and hold circuit 102 described above and the second reference voltage Vref12. In other words, the second reference voltage Vref12 is set for the purpose of determining the current.

The switching circuit 106 is turned ON/OFF according to the signal Data which is a pulse modulation data signal. An output of the switching circuit 106 is connected to a cathode of the LD 107 and a drive current Idrv is supplied to the LD 107. An anode of the LD 107 is connected to a power source Vcc. A cathode of the PD 108 which monitors the light amount of the LD 107 is connected to the power source Vcc, and an anode of the PD 108 is connected to the current-voltage conversion circuit 109. A monitor voltage Vm is generated by the supply of a monitor current Im to the current-voltage conversion circuit 109. The monitor voltage Vm is applied as negative feedback to the negative terminal of the comparator circuit 101.

In FIG. 5, although the engine controller 122 and the video controller 123 are illustrated separately, apart or whole of the functions of the engine controller 122 and the video controller 123 can be realized by a same controller. Further, regarding the laser drive system circuit 130 enclosed by a solid line illustrated in FIG. 5, for example, a part or whole of the circuit can be included in the engine controller 122. This is the same with FIG. 8 described below.

<Laser Drive According to the First Exemplary Embodiment>

Figure 6:
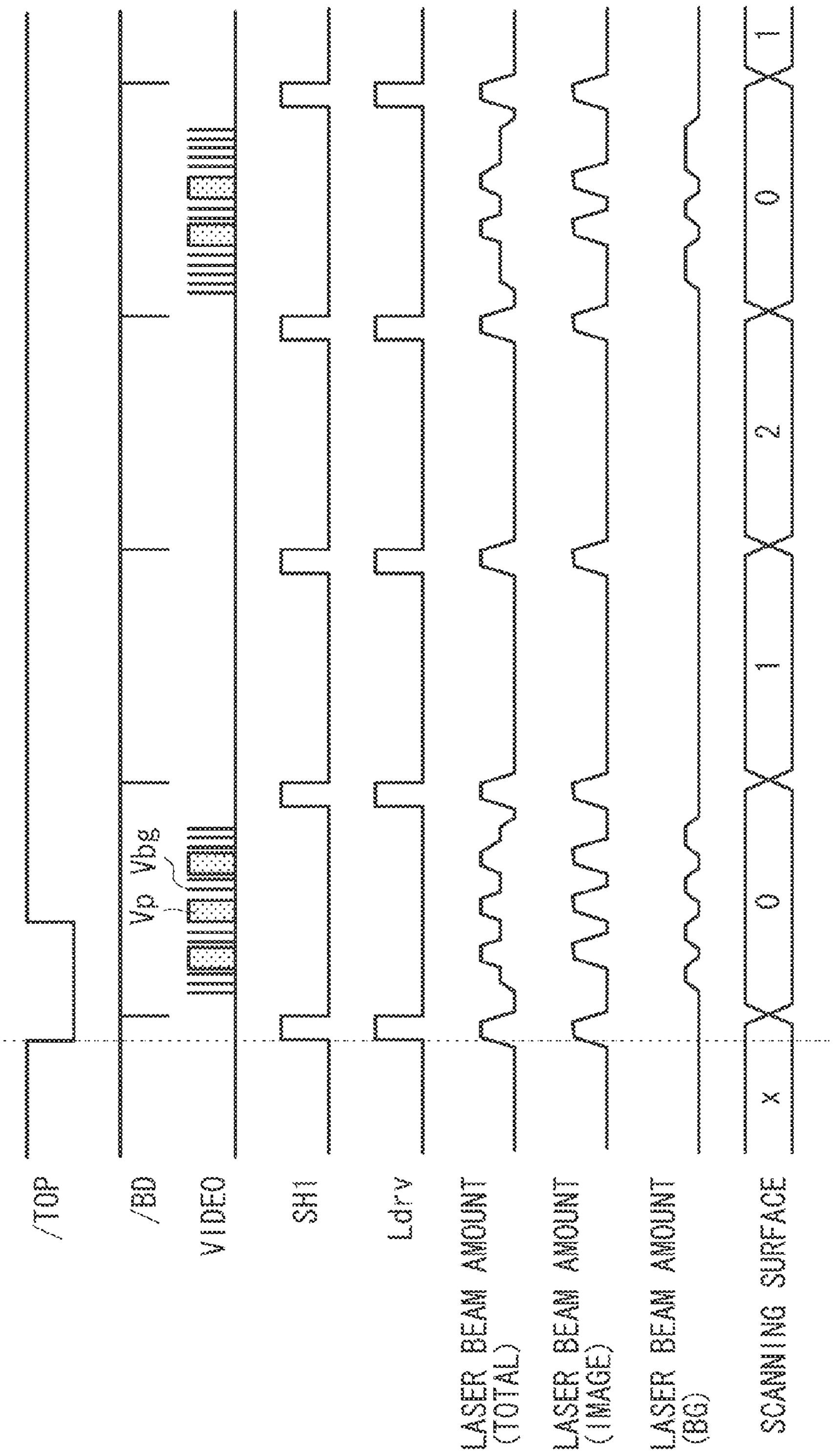
FIG. 6 is a timing chart illustrating relationships among laser control signals and amounts of laser beams.

The operation of the laser scanner 224 when the thinned image forming is performed according to the present exemplary embodiment will be described with reference to timing charts in FIGS. 6 and 7. FIG. 6 illustrates an example of the laser control signals and the amounts of laser in a case that the operation is performed by a printing method which performs double scan image thinning and the laser scanning surface that outputs the latent image is set to zero (0). The timing chart includes both the amount of laser emission at image output and the amount of laser emission at weak light emission.

The image forming apparatus according to the present exemplary embodiment performs control to change the processing speeds to deal with various types of media including rough paper and glossy paper in addition to plain paper. More specifically, in addition to the image forming by a normal processing speed (first mode), the image forming by a reduced processing speed (second mode) is executable. When an image is formed in the second mode, the exposure is performed by thinning the scanning surface of the polygonal mirror 203 so that image forming is performed at an image quality similar to that of the first mode can be realized without changing or not greatly changing the rotation speed of the polygonal mirror 203. The exposure employing the thinned scanning surface will be described below.

Operation of Scanning Surface Counter

Referring back again to FIG. 6, if each of the exposure control unit 409 and the image output unit 405 receives a BD signal when the TOP signal that notifies of the start of the page printing is "Low", that is, at the time of notification of the start of the image writing, each of the exposure control unit 409 and the image output unit 405 resets a built-in scanning surface counter individually provided for each unit to determine the scanning surface to zero (0). Each counter of the exposure control unit 409 and the image output unit 405 is incremented by one (1) each time a BD signal is received. However, if the counter has already reached the thinning number when the counter is to be incremented by one (1), the counter is reset to zero (0) instead of being incremented by one (1) in response to the reception of a BD signal. Accordingly, the laser scanning surface can be in synchronization with the exposure control unit 409 and the image output unit 405. If the count has reached the thinning number, it means that scanning of a total of three surfaces including the scanning surface and the non-scanning surfaces is finished.

Operation of Auto Power Control (APC)

The APC is a method for adjusting an amount of current to be supplied to the LD 107 at image output. According to the present exemplary embodiment, the APC is performed as described below.

First, the exposure control unit 409 obtains a reception timing of the BD signal based on the periodic reception of the BD signals. Next, just before the exposure control unit 409 receives the BD signal, the exposure control unit 409 outputs the SH1 signal and the Ldrv signal to the laser drive system circuit 130. Accordingly, the sample and hold circuit 102 in the laser drive system circuit 130 is put into a sample state. Further, the LD 107 is put into a light emission state by the Ldrv signal.

In this state, if the LD 107 is put into a whole surface light emission state, the PD 108 monitors the amount of light emission of the LD 107. Then, the monitor current Im which is in proportion to the amount of light emission is generated. Further, the current-voltage conversion circuit 109 generates the monitor voltage Vm by the monitor current Im flowing therethrough. Additionally, the current amplification circuit 104 controls the drive current Idrv based on the current Io1 flowing through the reference current source 105 so that the monitor voltage Vm is coincide with a first reference voltage Vref1 as the target voltage.

During the non-APC operation, in other words, when the normal image forming is performed, the sample and hold circuit 102 will be in a hold period (non-sampling period). The switching circuit 106 is turned ON/OFF according to the input signal Data, and pulse width modulation is applied to the drive current Idrv.

Operation of Printable Region

VIDEO data is output only at the time of the scanning surface is zero according to the image thinning control performed by the image output unit 405. The VIDEO data which is output at that time can be a pulse waveform Vp corresponding to the image data supplied from an external device or a pulse waveform Vbg based on the weak light emission corresponding to the non-image portion. As illustrated in FIG. 6, the pulse waveform. Vbg is thinner than the pulse waveform. Vp. The VIDEO data is not output at the scanning surfaces 1 and 2. The amount of light emission of the LD 107 when the VIDEO data is output is the laser beam amount (TOTAL). The amount of light emission generated by the image data is the laser beam amount (IMAGE), and the amount of light emission generated by the weak light emission is the laser beam amount (BG).

By controlling the light emission of the laser scanner 224 as described above, the charge potential of each photosensitive drum can be appropriately controlled by a simplified configuration while corresponding to different process speeds.

<Description of Image Thinning>

Next, thinned image output control will be described with reference to FIG. 7. FIG. 7 illustrates a relationship between an image output scanning surface and a weak light emission output scanning surface with respect to each image output scanning surface data setting when a double scan thinning output control is performed. The double scan thinning output control repeats "output, non-output, non-output, output, non-output, non-output" of the image with respect to the laser scanning.

Figure 7:
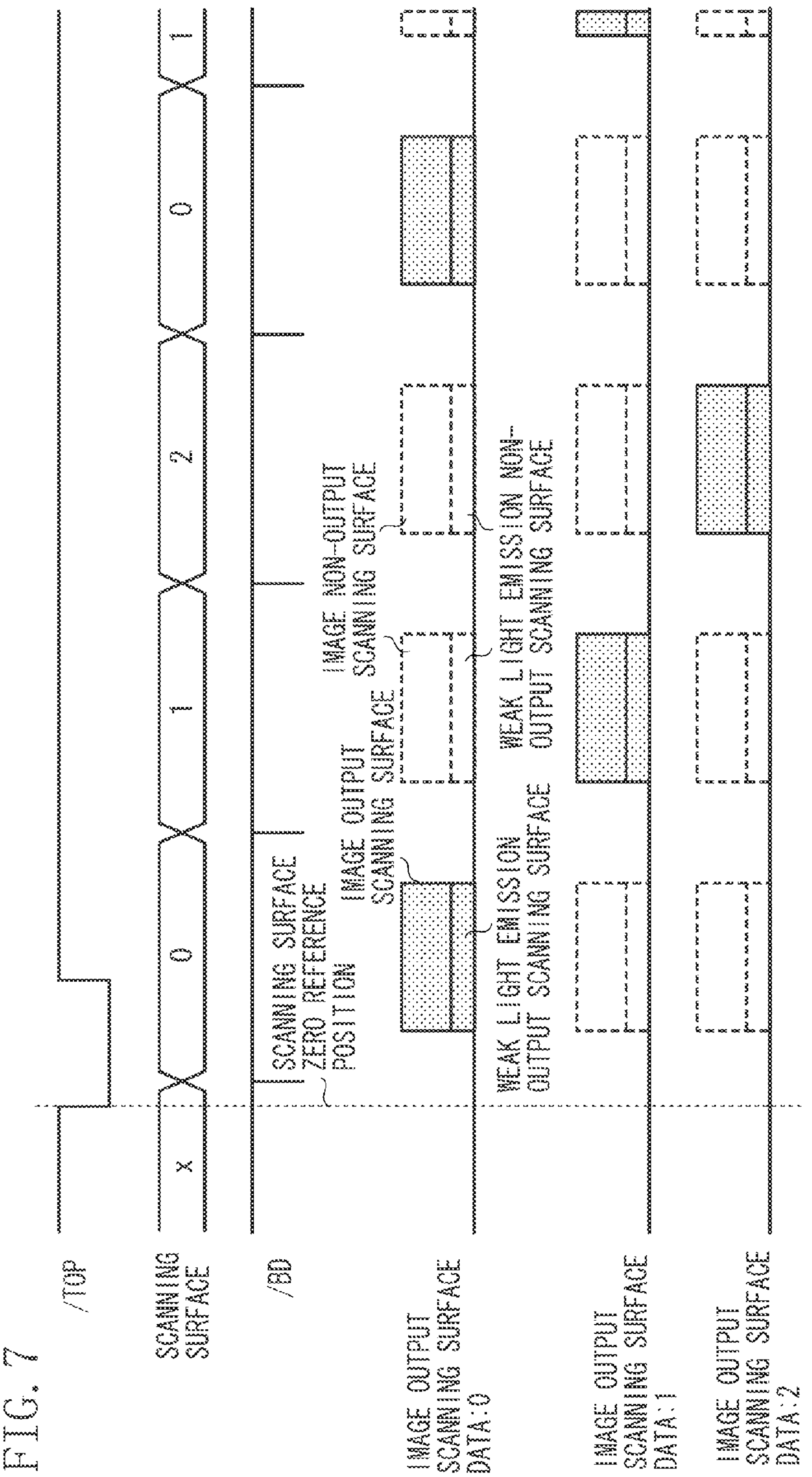
FIG. 7 is a timing chart illustrating thinning control.

In FIG. 7, the/TOP signal is a signal associated with the start of writing of an image in the sub-scanning direction (i.e., the rotation direction of the photosensitive drum 122) with respect to page printing. The/TOP signal also serves as a reference signal used for determining the laser scanning surface of the latent image output. The/BD signal is a reference signal associated with the start of writing of an image in the main-scanning direction (i.e., the axial direction of the photosensitive drum) with respect to page printing. In FIG. 7, the maximum number of the scanning surfaces is changed according to the thinning number. The scanning surface is managed by the scanning surface counter which is initialized by the/TOP signal and counts up the/BD signals.

As illustrated in FIG. 7, if "0" is set for the image output scanning surface, the image output unit 405 performs the latent image output and the weak light emission output on the scanning surfaces at which the scanning surface counter is "0". The drive current of the LD 107 is controlled so that it is turned OFF in a case where the scanning surface counter is "1" or "2".

On the other hand, if "1" is set for the image output scanning surface, it is controlled that the image output and the weak light emission output are permitted when the scanning surface counter is "1", whereas, the image output and the weak light emission output are prohibited when the scanning surface counter is "0" or "2". Similarly, if "2" is set for the image output scanning surface, it is controlled that the image output and the weak light emission output are permitted when the scanning surface counter is "2", whereas the image output and the weak light emission output are prohibited when the scanning surface counter is "0" or "1".

According to the present exemplary embodiment, the above-described image output scanning surface data is stored in the memory 407 of the engine controller 122, and the information is notified to the video controller 123 via a communication I/F. Further, since the scanning surface counter is provided for each of the exposure control unit 409 of the engine controller 122 and the image output unit 405 of the video controller 123, the image output control and the exposure control can be synchronized with respect to the scanning surface.

By controlling the light emission of the laser scanner 224 as described above, appropriate weak light emission can be performed corresponding to the different process speeds. Further, the charge potential of each photosensitive drum can be appropriately controlled by a simplified configuration.

Next, a second exemplary embodiment will be described. In order to simplify the description, configurations similar to those of the first exemplary embodiment are not repeated.

The components and configuration according to the present exemplary embodiment are similar to those illustrated in FIGS. 1 to 3 and described according to of the first exemplary embodiment. The point different from the first exemplary embodiment is that an APC adjustment control for weak light emission and a laser drive function for weak light emission are added to the laser drive system circuit. Further, a VIDEO (pulse) signal based on weak light emission is not output and only an exposure pulse signal based on print image data is output as the VIDEO signal from the laser drive system circuit 130. A control block diagram according to the present exemplary embodiment is similar to that illustrated in FIG. 4 except that the weak light emission data control unit 303, the weak light emission exposure pulse generation unit 306, and the exposure pulse generation unit 302 are not included and image information generated by the print image exposure pulse generation unit 304 is directly transmitted to the exposure pulse output control unit 307.

<Laser Drive System Circuit According to the Second Exemplary Embodiment>

Figure 8:
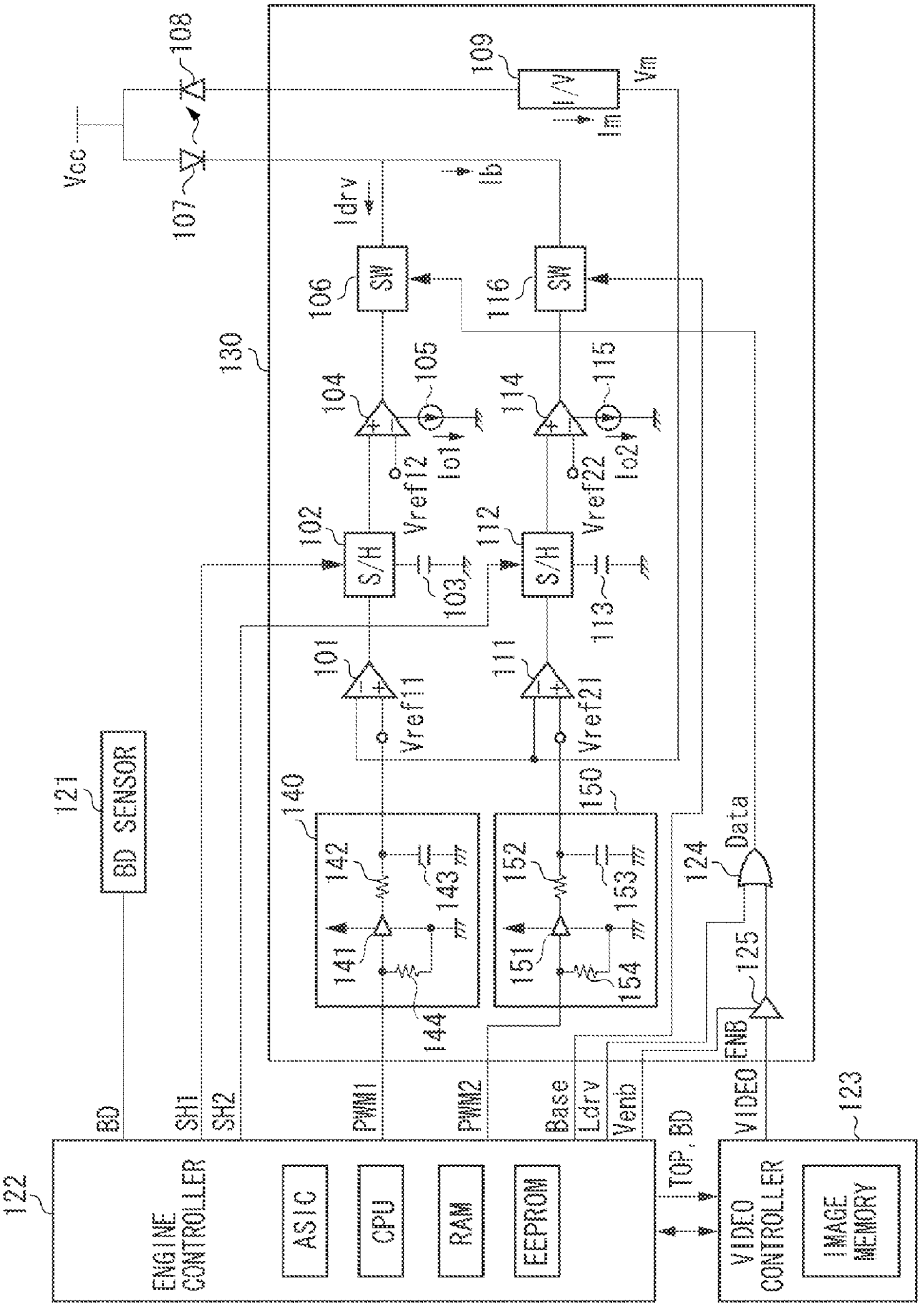
FIG. 8 illustrates the laser drive system circuit.

Next, the laser drive system circuit 130 to which the an embodiment of present invention can be applied will be described with reference to FIG. 8. FIG. 8 illustrates the laser drive system circuit 130 which automatically adjusts a light amount level of the LD 107 so that weak light is appropriately emitted from the LD 107 so as not to attach toner to the non-image portion of the photosensitive drum 222, which causes fog and reversed fog.

In FIG. 8, the laser drive system circuit 130, which is illustrated in FIG. 2, corresponds to the circuit enclosed by a solid line. The laser drive system circuit 130 includes the comparator circuits 101 and 111, the sample and hold circuits 102 and 112, the hold capacitors 103 and 113, the current amplification circuits 104 and 114, the reference current sources (constant current circuits) 105 and 115, and the switching circuits 106 and 116.

Further, the detection side of the laser drive system circuit 130 includes the LD 107, the PD 108, the current-voltage conversion circuit 109, and the synchronization detection signal element (BD sensor) 121. Further, the circuits 140 and 150 generate a reference voltage for determining the laser drive current which is used when a latent image is formed according to the signals PWM1 and PWM2 output from the exposure control unit 409 of the engine controller 122. The circuits 140 and 150 include the protective resistors 144 and 154, the inverters 141 and 151, and the smoothing filters 142 and 143 and smoothing filters 152 and 153.

Although described in detail below, components with reference numerals 101 to 106 and 140 to 144 correspond to light amount adjustment units of the image output and components with reference numerals 111 to 116 and 150 to 154 correspond to light amount adjustment units of the weak light emission. The duty of the signals PWM1 and PWM2 is determined in advance and the information of the duty is stored in the memory 407 of the engine controller 122.

The Ldrv signal output from the engine controller 122 and the VIDEO signal output from the video controller 123 are input to input terminals of the OR circuit 124. The output signal DATA is input to the switching circuit 106 described below. The VIDEO signal is generated based on the print data transmitted from a reader scanner connected to an external device or from an external device such as a host computer.

The VIDEO signal output from the video controller 123 is input to the buffer 125 having an enable terminal. The output of the buffer 125 is input to the above-described OR circuit 124. The Venb signal output from the engine controller 122 is input to the enable terminal. The engine controller 122 outputs the SH1 signal, an SH2 signal, a BASE signal, the Ldrv signal, and the Venb signal described below.

The first reference voltage Vref11 and a third reference voltage Vref21 are applied to the positive terminals of the comparator circuits 101 and 111, respectively. The output terminals of the comparator circuits 101 and 111 are respectively connected to the sample and hold circuits 102 and 112. The reference voltage Vref11 is set as a target voltage for causing the LD 107 to emit light beams at a light emission level for normal printing. The reference voltage Vref21 is set as a target voltage for causing the LD 107 to emit light beams at a light emission level for weak light emission. The hold capacitors 103 and 113 are connected to the sample and hold circuits 102 and 112, respectively. The outputs of the hold capacitors 103 and 113 are input to the positive terminals of the current amplification circuits 104 and 114, respectively.

The reference current sources 105 and 115 are connected to the current amplification circuits 104 and 114, respectively. The outputs of the current amplification circuits 104 and 114 are input to the switching circuits 106 and 116, respectively. On the other hand, a third reference voltage Vref12 and a fourth reference voltage Vref22 are applied to negative terminals of the current amplification circuits 104 and 114, respectively. The current Io1 (first drive current) is determined based on the difference between the output voltage of the sample and hold circuit 102 described above and the third reference voltage Vref12. Similarly, a current Io2 (second drive current) is determined based on the difference between the output voltage of the sample and hold circuit 112 described above and the fourth reference voltage Vref22. In other words, the third reference voltage Vref12 and the fourth reference voltage Vref22 are set for the purpose of determining the current.

The switching circuit 106 is turned ON/OFF according to the signal Data which is a pulse modulation data signal. The switching circuit 116 is turned ON/OFF according to the input signal Base.

The outputs of the switching circuits 106 and 116 are connected to the cathode of the LD 107 and the drive currents Idrv and Ib are supplied to the LD 107. The anode of the LD 107 is connected to the power source Vcc. The cathode of the PD 108 which monitors the light amount of the LD 107 is connected to the power source Vcc. The anode of the PD 108 is connected to the current-voltage conversion circuit 109. A monitor voltage Vm is generated by the supply of the monitor current Im to the current-voltage conversion circuit 109. The monitor voltage Vm is applied as negative feedback to respective negative terminals of the comparator circuits 101 and 111.

<Laser Drive According to the Second Exemplary Embodiment>

Figure 9:
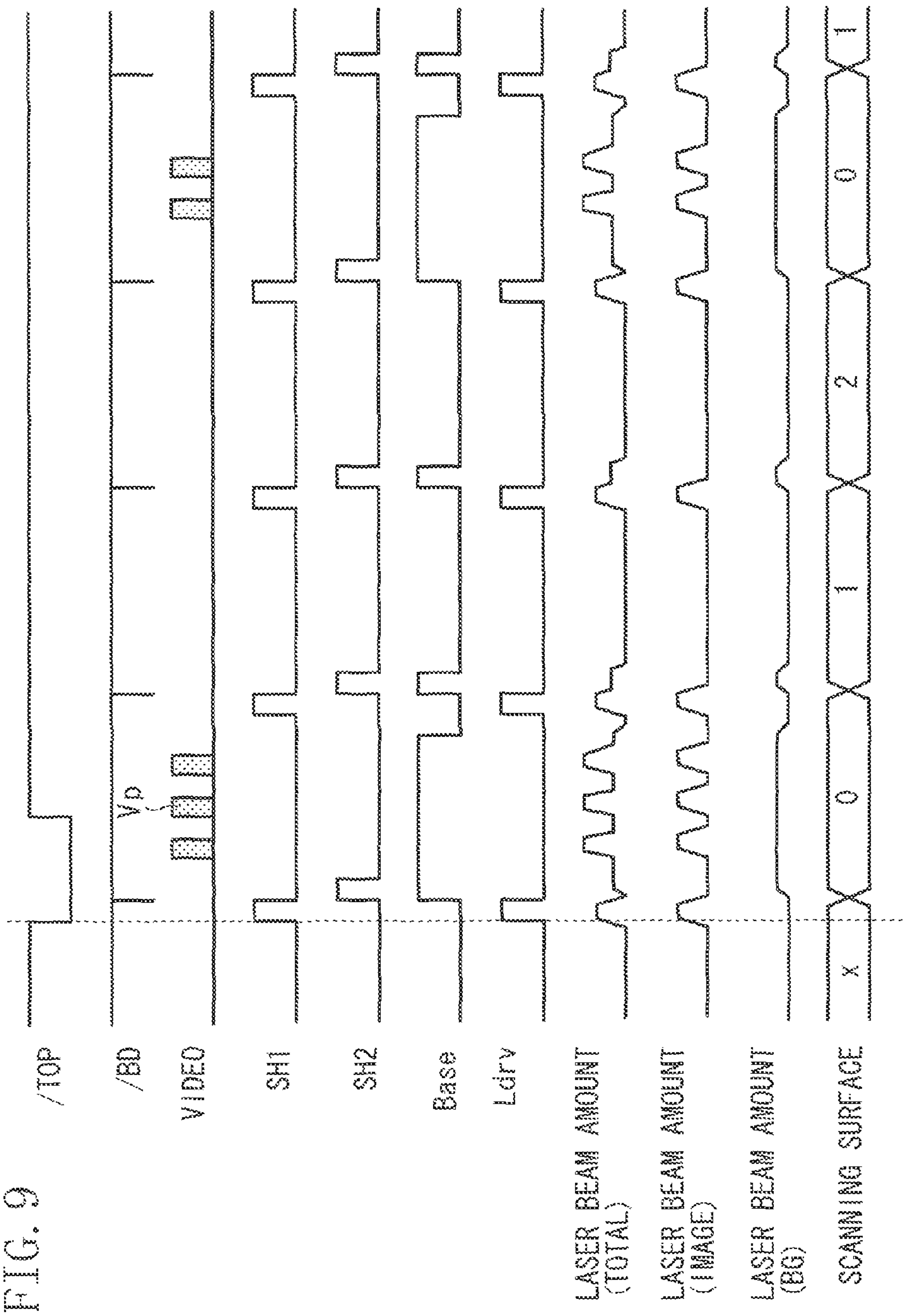
FIG. 9 is a timing chart illustrating relationships among laser control signals and amounts of laser beams.

The operation of the laser scanner 224 when the thinned image forming is performed according to the second exemplary embodiment will be described with reference to FIG. 8 and a timing chart in FIG. 9. FIG. 9 illustrates an example of the laser control signals and the amounts of laser in a case that the operation is performed by double scan image thinning and the laser scanning surface that outputs the latent image is set to zero (0). The timing chart separately illustrates the amount of laser emission at image output and the amount of laser emission at weak light emission. Since the operation of the scanning surface determination counter is described in the first exemplary embodiment, the description is not repeated.

APC Operation for Image Data Light Emission

The engine controller 122 sets the sample and hold circuit 112 to the hold state (non-sampling period) according to the SH2 signal and sets the switching circuit 116 to the OFF state according to the input signal Base. Further, the engine controller 122 changes the state of the sample and hold circuit 102 to the sampling state according to the SH1 signal and turns ON the switching circuit 106 according to the input signal Data. More specifically, at that time, the engine controller 122 controls the Ldrv signal so that the input signal Data is set to a level that changes the LD 107 to the light emission state. The period the sample and hold circuit 102 is in the sampling state corresponds to the period of the APC operation.

In this state, if the state of the LD 107 is changed to a whole surface light emission state, the PD 108 monitors the amount of light emission of the LD 107, and, a monitor current 1 ml which is in proportion to the amount of light emission is generated. Further, the current-voltage conversion circuit 109 generates a monitor voltage Vm1 from the monitor current 1 ml flowing therethrough. Additionally, the current amplification circuit 104 controls the drive current Idrv based on the current Io1 flowing through the reference current source 105 so that the monitor voltage Vm1 is coincide with the first reference voltage Vref11 as the target voltage.

During the non-APC operation, in other words, when the normal image forming is performed, the sample and hold circuit 102 will be in the hold period (non-sampling period). The switching circuit 106 is turned ON/OFF according to the input signal Data, and pulse width modulation is applied to the drive current Idrv.

APC Operation for Weak Light Emission

The engine controller 122 sets the sample and hold circuit 102 to the hold state (non-sampling period) according to the SH1 signal and sets the switching circuit 106 to the OFF state according to the input signal Data. According to the input signal Data, the engine controller 122 disables the Venb signal input to the enable terminal of the buffer 125, controls the Ldrv signal, and changes the input signal Data to the OFF state. Further, the engine controller 122 sets the sample and hold circuit 112 to the APC operation state according to the SH2 signal and turns ON the switching circuit 116 according to the input signal Base. Accordingly, the state of the LD 107 is changed to the state where the LD 107 emits light beams of weak light emission.

In this state, if the state of the LD 107 is changed to a whole surface weak light emission state (emission maintaining state) in low intensity, the PD 108 monitors the amount of light emission of the LD 107 and generates a monitor current Im2 (Im1>Im2) which is proportional to the amount of light emission. Then, a monitor voltage Vm2 is generated by the supply of the monitor current Im2 to the current-voltage conversion circuit 109. The current amplification circuit 114 controls the drive current Ib based on the current Io2 flowing through the reference current source 115 so that the monitor voltage Vm2 is coincide with the third reference voltage Vref21 as the target value.

During the non-APC operation, in other words, during the normal image forming operation (while the image signal is being transmitted), the sample and hold circuit 112 is in the hold period (non-sampling period), and the whole surface weak light emission in the low intensity state is maintained.

If it is possible to disregard the fog and reversed fog of toner, the amount of laser emission of the weak light emission can beset to such intensity that the charge potential is not below the development potential. However, since it is not possible to disregard the fog and reversed fog, it is necessary to consistently stabilize a light amount P(Ib) during the image forming.

Operation of Printable Region

When the LD 107 emits light beams at a light emission level for normal printing to the scanning surface at which the scanning surface counter is "0" for the imaging portion of the photosensitive drum 222, the laser drive system circuit illustrated in FIG. 8 operates as described below.

Both the sample and hold circuits 102 and 112 are set to the hold state. The Base signal is controlled to turn ON the switching circuit 116. In addition, the switching circuit 106 is turned ON/OFF according to the VIDEO signal. Accordingly, the VIDEO data that corresponds to the imaging portion of the photosensitive drum 222 is output. During the VIDEO data is output, the drive current Idrv+Ib is supplied to the LD 107. In other words, the LD 107 is driven by a drive current obtained by adding the drive current of the image output and the drive current of the weak light emission. Accordingly, the imaging portion of the photosensitive drum 222 is exposed to light with an amount of exposure of the normal exposure (first exposure amount). On the other hand, if the VIDEO data is not output, only the drive current Ib is supplied to the LD 107. In other words, weak light emission is directed to the non-image portion of the photosensitive drum 222, and the non-image portion is exposed to light with an amount of exposure of the weak exposure (second exposure amount).

With respect to the scanning surfaces on which images are thinned (scanning surfaces corresponding to the scanning surface counter of "1" and "2"), the Base signal is controlled to be OFF so that the supply of the drive current to the LD 107 is stopped. Accordingly, the light emission of the LD 107 is stopped. The laser control described with reference to FIG. 9 can be realized by the above-described control.

By controlling the light emission of the laser scanner 224 as described above, the charge potential of each photosensitive drum can be appropriately controlled by a simplified configuration while corresponding to different process speeds.

Further, according to the present exemplary embodiment, both the sample and hold circuits 102 and 112 are set to the hold state, the Base signal is controlled to turn ON the switching circuit 116, and the switching circuit 106 is turned ON/OFF according to the VIDEO signal. More specifically, a same scanning surface is used for the light emission for normal printing and for weak light emission, so that the scanning surface for weak light emission is thinned, and the weak light emission is always performed when the LD 107 emits light beams according to the VIDEO signal.

Accordingly, when the drive current Idrv is output to form a latent image based on the VIDEO signal, the drive current Idrv+Ib is supplied to the LD 107. Thus, the electric potential at a portion (bright portion) of the photosensitive drum 222 to which the toner is attached can be controlled to an appropriate level. When the thinned image forming is performed, the drive current Idrv which is equal to the current Idrv when the thinned image forming is not performed can be used.

Next, a third exemplary embodiment will be described. The points which are different from the first exemplary embodiment will be mainly described. The components and configuration according to the present exemplary embodiment are similar to those illustrated in FIGS. 1 to 3 and 5 and described according to the first exemplary embodiment. The point different from the first exemplary embodiment is that the data of the scanning surface for weak light emission and the data of the scanning surface for image output are separately stored in the memory and, accordingly, the weak light emission and the image output can be performed for different scanning surfaces. Since other configurations are similar to those of the first exemplary embodiment, their descriptions are not repeated.

<Image Output Unit According to the Third Exemplary Embodiment>

Figure 10:
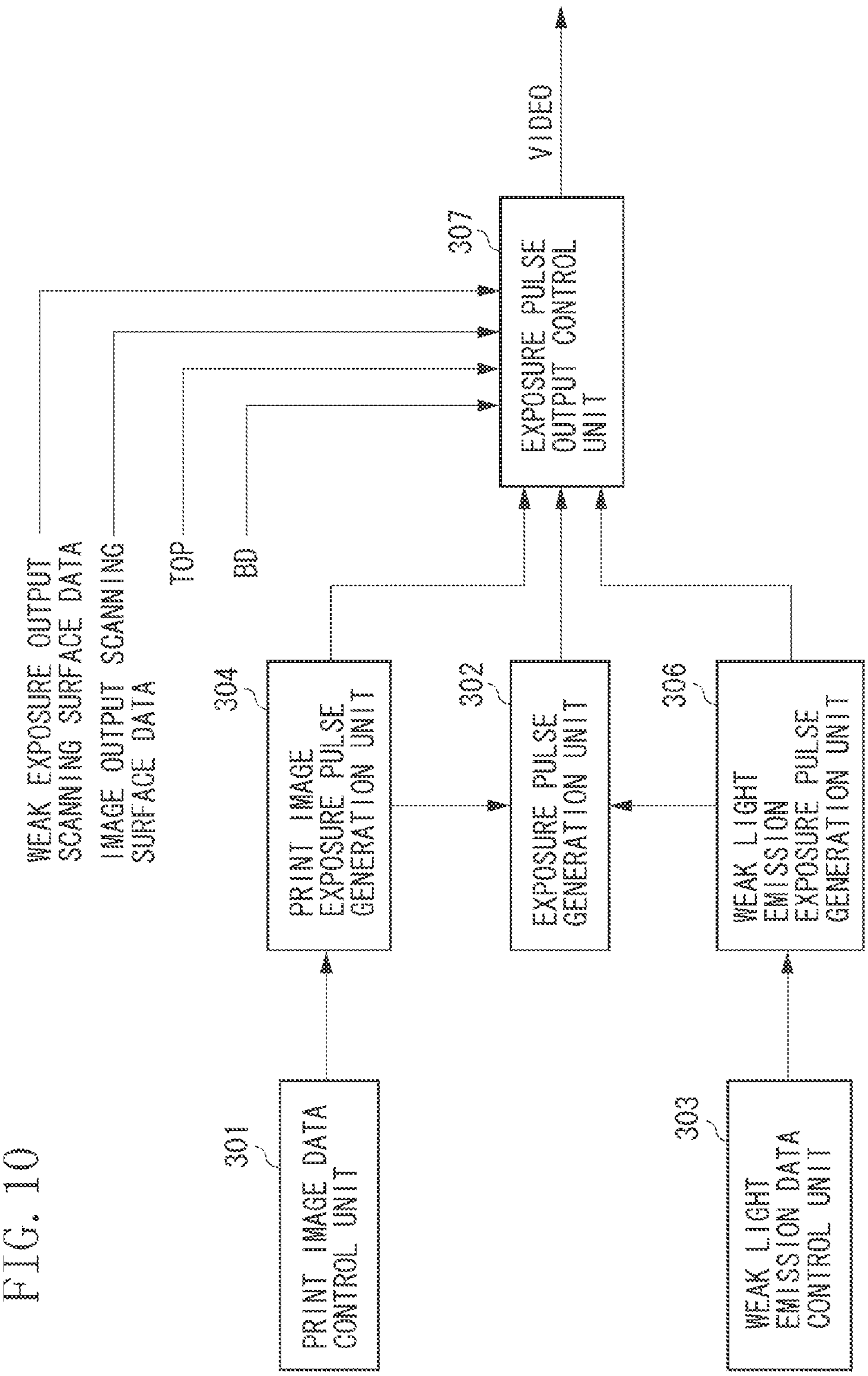
FIG. 10 illustrates details of the image output unit.

Next, the image output unit 405 to which an embodiment of the present invention can be applied will be described in detail below with reference to FIG. 10.

The print image data control unit 301 controls and manages data to be printed. The weak light emission data control unit 303 controls and manages a control parameter of the weak light emission. The print image exposure pulse generation unit 304 generates an exposure pulse for printing image based on the print image data output from the print image data control unit 301. The weak light emission exposure pulse generation unit 306 generates an exposure pulse for weak light emission based on the weak light emission data output from the weak light emission data control unit 303.

The exposure pulse generation unit 302 couples the exposure pulse output from the print image exposure pulse generation unit 304 and the exposure pulse output from the weak light emission exposure pulse generation unit 306 and regenerates an exposure pulse when the latent image output scanning surface and the weak light emission output scanning surface are the same scanning surface. The exposure pulse output control unit 307 determines the output timing of the exposure pulse based on the BD signal transmitted from the laser scanner 224, the TOP signal transmitted from the engine controller 122, and the image output scanning surface data and the weak exposure output scanning surface data input from in the memory 407. Then, the exposure pulse output control unit 307 selects any signal from an exposure pulse signal input from the print image exposure pulse generation unit 304, an exposure pulse signal input from the weak light emission exposure pulse generation unit 306, and an exposure pulse signal input from the exposure pulse generation unit 302, and transmits the selected exposure pulse signal (the VIDEO signal in FIG. 10) to the laser scanner 224.

According to the present exemplary embodiment, since the scanning surface of weak light emission is determined based on the weak light emission output scanning surface data transmitted from the engine controller 122, unnecessary weak light emission at the thinned scanning surface can be prevented.

<Laser Drive According to the Third Exemplary Embodiment>

Figure 11:
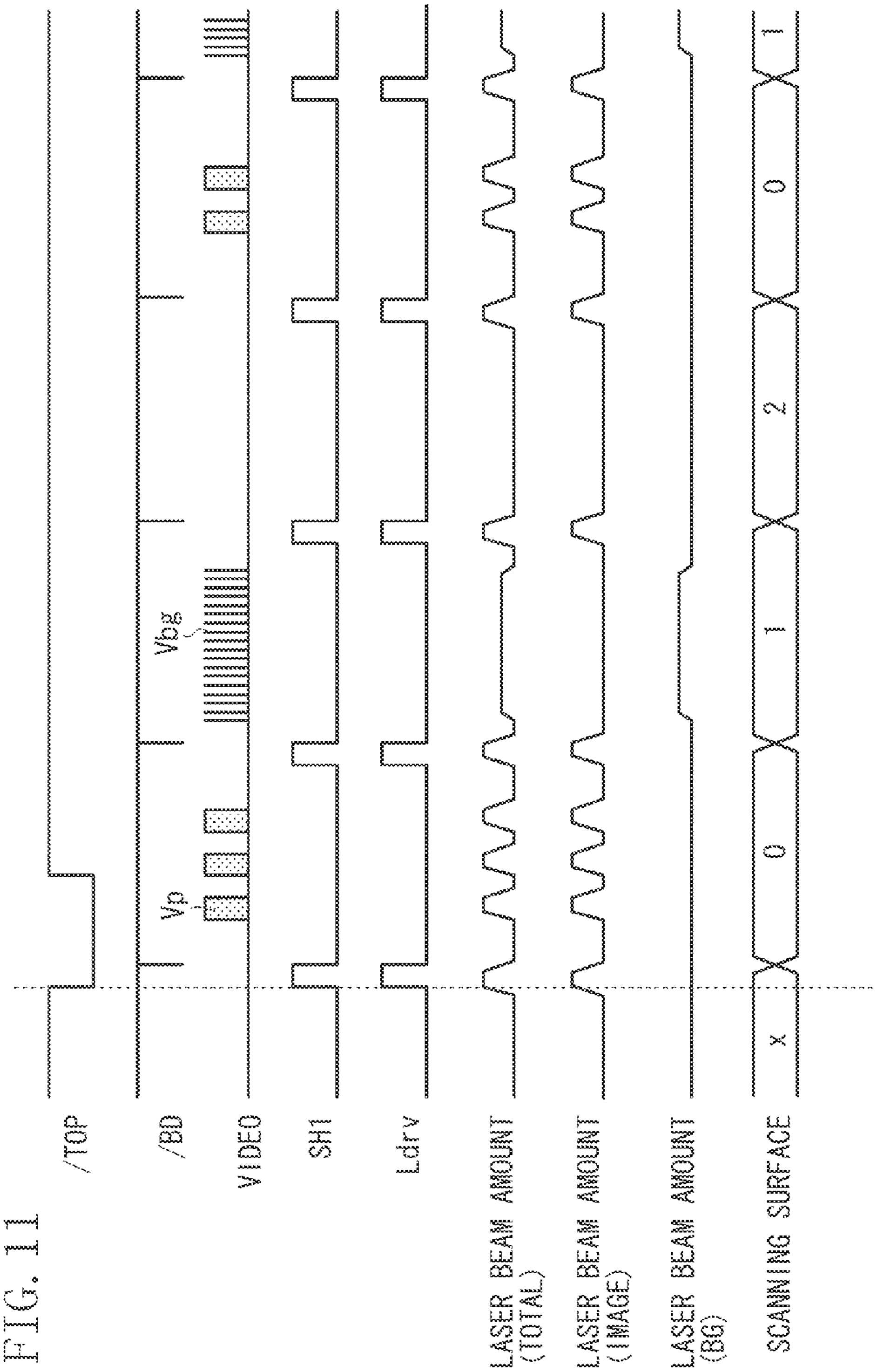
FIG. 11 is a timing chart illustrating relationships among laser control signals and amounts of laser beams.

The operation of the laser scanner 224 when the thinned image forming is performed according to the present exemplary embodiment will be described with reference to a timing chart in FIG. 11. FIG. 11 illustrates an example of the laser control signals and the amounts of laser in a case where the operation is performed by a printing method which performs double scan image thinning, and when the laser scanning surface that outputs the latent image is set to zero (0) and the scanning surface that corresponds to the weak exposure is set to 1. Although the amount of laser emission at image output and the amount of laser emission at weak light emission are not actually the amount of light emitted by the LD 107, they are illustrated in FIG. 11 for illustrative purposes.

Operation of Scanning Surface Determination Counter

If the exposure control unit 409 and the image output unit 405 receive a BD signal when the TOP signal for notifying the start of the page printing is "Low", that is, at the time of notification of the start of the image writing, the exposure control unit 409 and the image output unit 405 reset respective built-in scanning surface counters individually provided for determining the scanning surface to zero (0). Each counter of the exposure control unit 409 and the image output unit 405 is incremented by one (1) each time a BD signal is received. However, if the counter has already reached the thinning number, the counter is reset to zero (0) instead of being incremented by one (1) in response to the reception of a BD signal. Accordingly, the laser scanning surface can be in synchronization with the exposure control unit 409 and the image output unit 405.

Operation of APC

The APC is a method for adjusting the amount of current supplied to the LD 107 at image output. According to the present exemplary embodiment, the APC is performed as described below.

First, the exposure control unit 409 obtains a reception timing of the BD signal based on the periodic reception of the BD signals. Next, just before the exposure control unit 409 receives the BD signal, the exposure control unit 409 outputs the SH1 signal and the Ldrv signal to the laser drive system circuit 130. Accordingly, the sample and hold circuit 102 in the laser drive system circuit 130 is put into the sample state. Further, the LD 107 is put into a light emission state by the Ldrv signal.

In this state, if the state of the LD 107 is changed to the whole surface light emission state, the PD 108 monitors the amount of light emission of the LD 107. Then, the monitor current Im which is in proportion to the amount of light emission is generated. Further, the current-voltage conversion circuit 109 generates the monitor voltage Vm by the monitor current Im flowing therethrough. Additionally, the current amplification circuit 104 controls the drive current Idrv based on the current Io1 flowing through the reference current source 105 so that the monitor voltage Vm is coincide with a first reference voltage Vref1 as the target voltage.

During the non-APC operation, in other words, when the normal image forming is performed, the sample and hold circuit 102 will be in the hold period (non-sampling period). The switching circuit 106 is turned ON/OFF according to the input signal Data, and pulse width modulation is applied to the drive current Idrv.

Operation of Printable Region

The VIDEO data is output at the scanning surface 0 (latent image) and a scanning surface 1 (weak exposure) according to the image output control performed by the image output unit 405. Further, the VIDEO data which is output at that time has the pulse waveform Vp based on the image data at the scanning surface 0, or the pulse waveform. Vbg based on the weak light emission at the scanning surface 1. As illustrated in FIG. 11, the pulse waveform Vbg is generally thinner than the pulse waveform Vp. The VIDEO data is not output at the scanning surface 2. The amount of light emission of the LD 107 when the VIDEO data is output is the laser beam amount (TOTAL). The amount of light emission generated by the image data is the laser beam amount (IMAGE), and the amount of light emission generated by the weak light emission is the laser beam amount (BG).

<Thinning of Image Output and Weak Light Emission Output>

Figure 12:
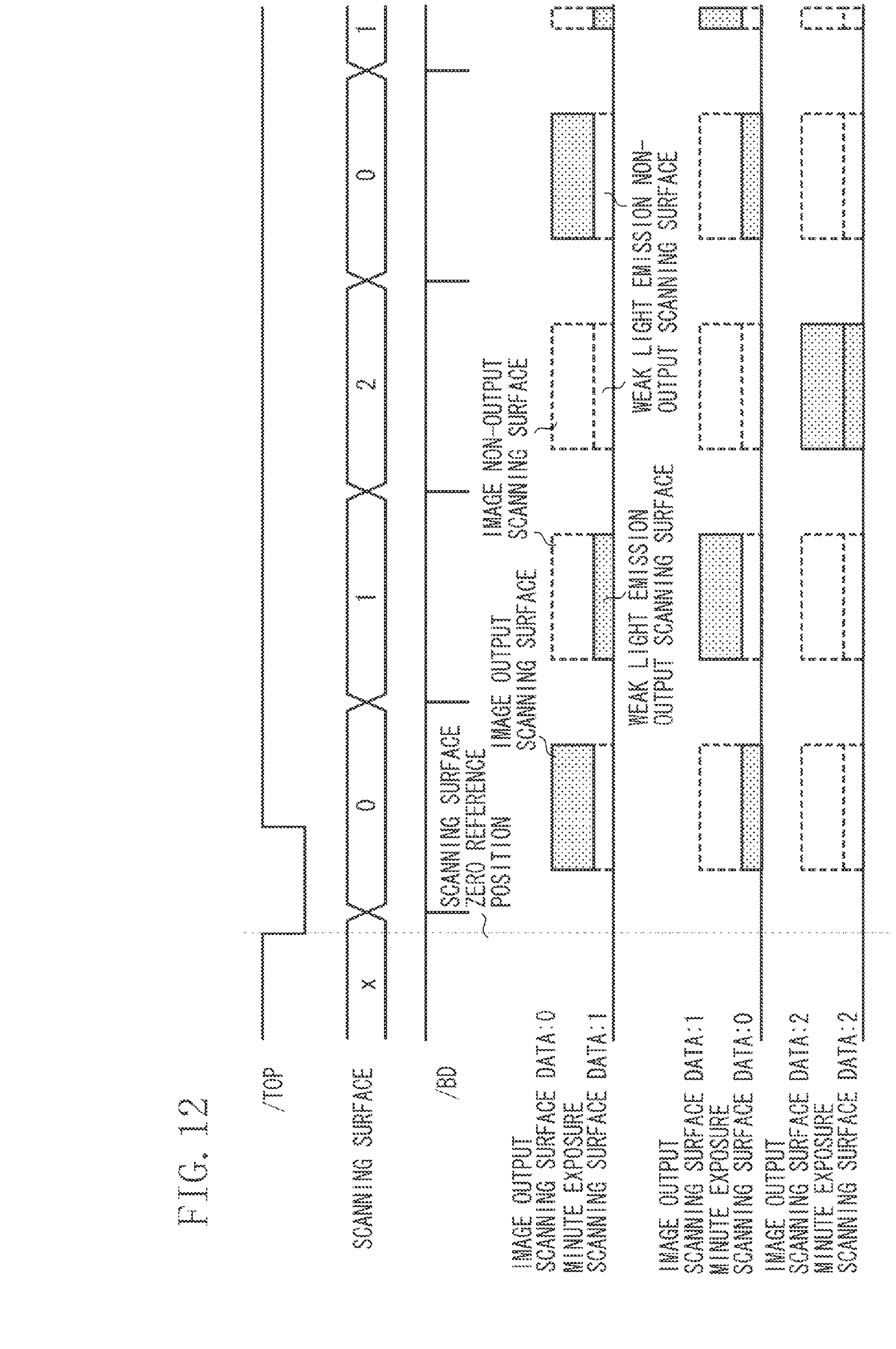
FIG. 12 is a timing chart illustrating the thinning control.

Next, the thinning control of the image output and the weak light emission output according to the present exemplary embodiment will be described with reference to FIG. 12. FIG. 12 illustrates a relationship between an image output scanning surface and a weak light emission output scanning surface with respect to each image output scanning surface data setting when the double scan thinning output control is performed. The double scan thinning output control repeats "output, non-output, non-output, output, non-output, non-output" of the image and the weak light emission with respect to the laser scanning.

In FIG. 12, the/TOP signal is a reference signal associated with the start of writing of an image in the sub-scanning direction (i.e., the rotation direction of the photosensitive drum 122) with respect to page printing. In other words, the/TOP signal is the first timing signal of the latent image forming and also serves as a reference signal used for determining the laser scanning surface of the latent image output. The/BD signal is a reference signal associated with the start of writing of an image in the main-scanning direction (i.e., the axial direction of the photosensitive drum) with respect to page printing. In FIG. 12, the maximum number of the scanning surfaces is changed according to the thinning number. The scanning surface is managed by the scanning surface counter which is initialized by the/TOP signal and counts up the/BD signals.

As illustrated in FIG. 12, if "0" is set for the image output scanning surface and "1" is set for the weak light emission output scanning surface, the image output unit 405 performs the latent image output at the scanning surfaces that correspond to "0" of the scanning surface counter and performs the weak light emission output at the scanning surfaces that correspond to "1" of the scanning surface counter. The drive current of the LD 107 is controlled so that it is turned OFF when the scanning surface counter is "2". If "1" is set for the image output scanning surface and "0" is set for the weak light emission output scanning surface, it is controlled that the image output is permitted when that scanning surface counter is "1", the driving of LD 107 for the weak light emission output is permitted when the scanning surfaces counter is "0", and the driving of the LD 107 is prohibited when the scanning surface counter is "2". Further, if "2" is set for the image output scanning surface and the weak light emission output scanning surface, it is controlled that the image output and the weak light emission output are permitted when the scanning surface counter is "2", and are prohibited when the scanning surface counter is "0" and "1".

According to the present exemplary embodiment, the above-described image output scanning surface data is stored in the memory 407 of the engine controller 122, and the information is notified to the video controller 123 via a communication I/F. Further, since the scanning surface counter is provided for each of the exposure control unit 409 of the engine controller 122 and the image output unit 405 of the video controller 123, the image output control and the exposure control can be synchronized with respect to the scanning surface. If the video controller 123 and the engine controller 122 are configured as one IC, a counter is not necessarily provided for each controller.

As described above, by controlling the light emission of the laser scanner 224, stable weak light emission output of a level similar to the level which is obtained when the thinned image output is not performed can be realized when the thinned image output is performed by a simple method. Further, according to the present exemplary embodiment, weak exposure is performed for the scanning surface other than the scanning surface for the normal exposure. Since a conflict between an output timing of a latent image and an output timing of weak light emission can be avoided, weak light emission can be stably performed regardless of the latent image. This is the advantage of the third exemplary embodiment over the first exemplary embodiment.

Another Embodiment of the Third Exemplary Embodiment

Figure 13:
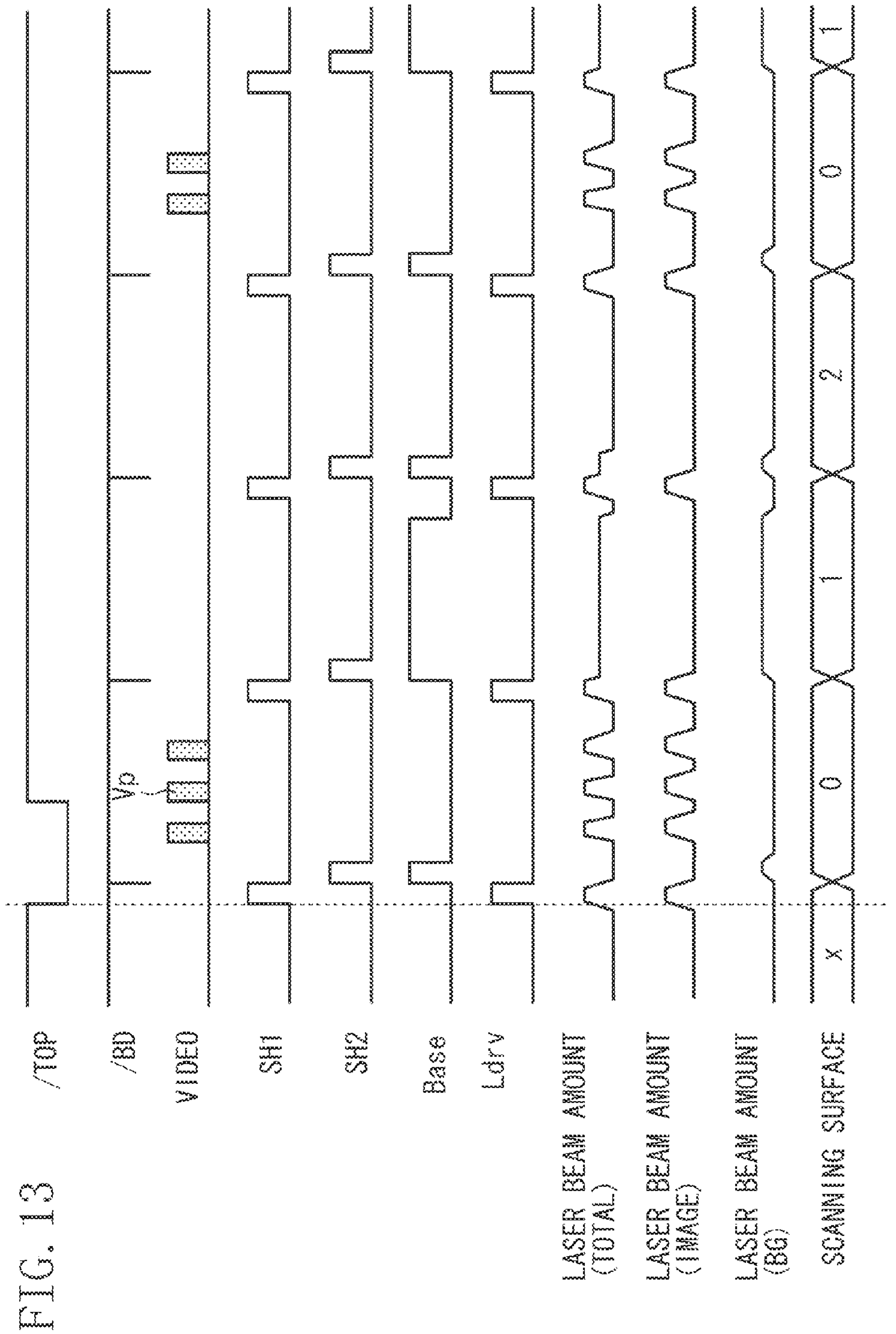
FIG. 13 is a timing chart illustrating relationships among laser control signals and amounts of laser beams.

An alternate version of the third exemplary embodiment will be described. The configuration that enables the weak light emission and the image output for different scanning surfaces according to the third embodiment is also applicable to the configuration including the laser drive system described with reference to FIGS. 1 to 3 and 8 according to the second exemplary embodiment. FIG. 13 is a timing chart for controlling the weak light emission and the image output for different scanning surfaces according to the present exemplary embodiment. In this case, the image output scanning surface is set to zero (0), and the weak light emission output scanning surface is set to one (1). As illustrated in FIG. 13, the latent image output is performed according to the drive current Idrv at the scanning surfaces that correspond to "0" of the scanning surface counter, and the weak light emission output is performed according to the drive current Ib at the scanning surfaces that correspond to "1" of the scanning surface counter is performed according to the drive current Ib. The drive current of the LD 107 is controlled so that it is turned OFF when the scanning surface counter is "2".

As described above, the configuration that enables the weak light emission and the image output for different scanning surfaces according to the present exemplary embodiment is also applicable to the configuration that uses the drive current Idrv for the latent image output based on image data and uses the drive current Ib for the weak light emission output. However, the drive current Idrv which is output for the latent image output at the scanning surface corresponding to the scanning surface counter 0 is set to such a drive current that the latent image can be formed without the addition of the drive current Ib.

By controlling the light emission of the laser scanner 224 as described above, the charge potential of each photosensitive drum can be appropriately controlled by a simplified configuration while corresponding to different process speeds.

Next, a fourth exemplary embodiment will be described. The points which are different from the first exemplary embodiment will be mainly described. The components and configuration according to the present exemplary embodiment are similar to those illustrated in FIGS. 1 to 3 and 5 and described according to the first exemplary embodiment. The point different from the first exemplary embodiment is that, as is with the third exemplary embodiment, the data of the scanning surface for weak light emission and the data of the scanning surface for image output are separately stored in the memory and, accordingly, the weak light emission and the image output can be performed for different scanning surfaces.

Since other configurations are similar to those of the first exemplary embodiment, their descriptions are not repeated. Further, since the configuration of the image output unit 405 is similar to the configuration illustrated in FIG. 10 and described according to the third exemplary embodiment, the description is not repeated. Although the number of thinned surfaces for the latent image output is equal to the number of thinned surfaces for the weak light emission output according to the third exemplary embodiment, according to the present exemplary embodiment, the number of thinned surfaces for the latent image output and the number of thinned surfaces for the weak light emission output are different.

<Laser Drive According to the Fourth Exemplary Embodiment>

Figure 14:
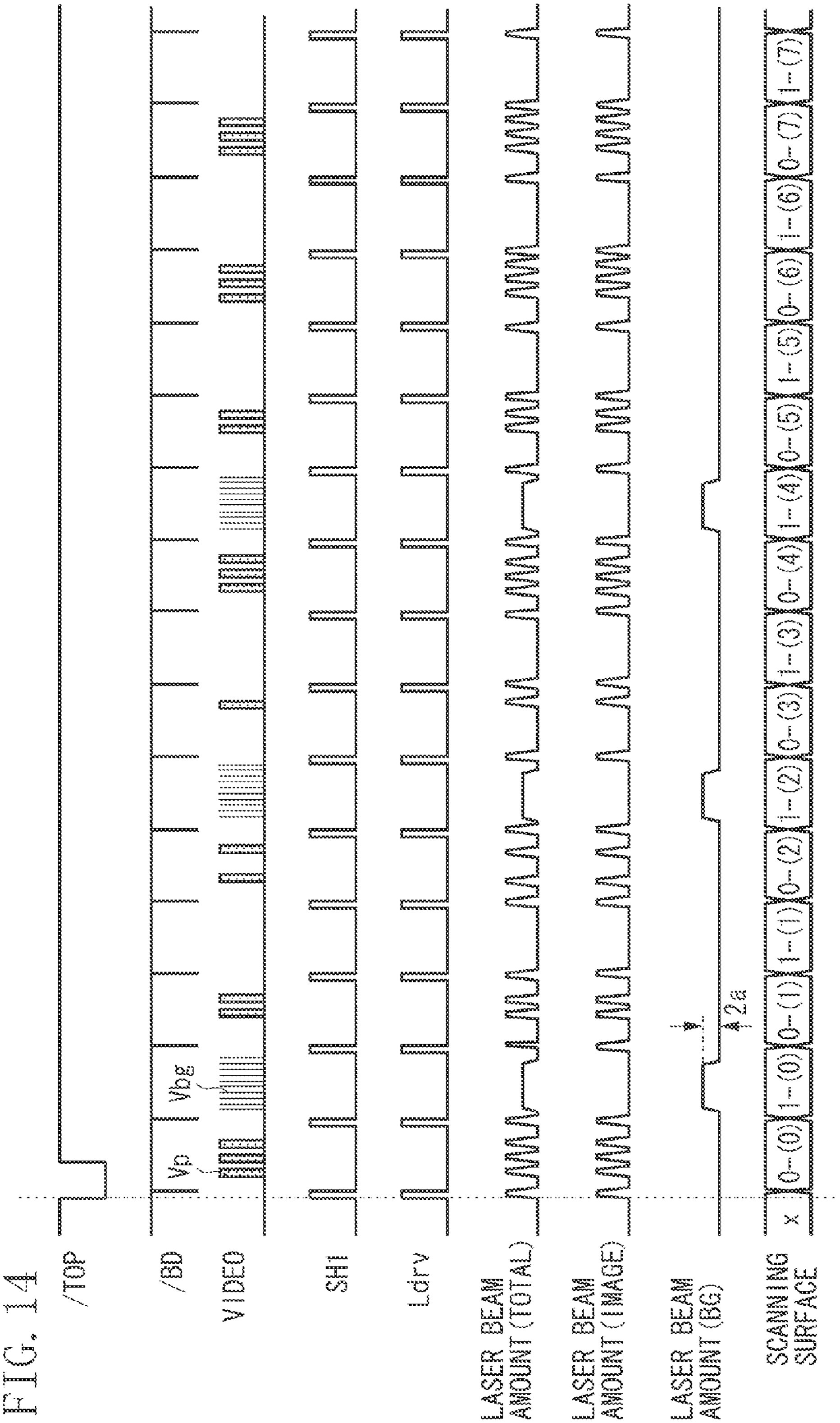
FIG. 14 is a timing chart illustrating relationships among laser control signals and amounts of laser beams.

The operation of the laser scanner 224 when the thinned image forming is performed according to the present exemplary embodiment will be described with reference to FIG. 5 and a timing chart in FIG. 14. FIG. 14 illustrates an example of the laser control signals and the amounts of laser in a case where the operation is performed by a printing method which performs thinning scan alternatively and when the scanning surface that outputs the latent image is set to zero (0) and the laser scanning surface that does not output the latent image is set to one (1). Although the amount of laser emission at image output and the amount of laser emission at weak light emission are not actually the amount of light emitted by the LD 107, they are illustrated in FIG. 14 for illustrative purposes.

Operation of Scanning Surface Determination Counter

The scanning surface counter according to the present exemplary embodiment includes a main counter and a sub counter. The main counter counts the scanning surface. The sub counter counts the number of times the main counter has been reset to zero (0) and thus counts the number (n) indicating the set number of the scanning surface control. For example, if the scanning surface is "0" and the scanning surface control set number is "3", it is expressed as "0-(3)".

If the exposure control unit 409 and the image output unit 405 (see FIG. 3) receive a BD signal when the TOP signal that notifies of the start of the page printing is "Low", that is, at the time of notification of the start of the image writing, the exposure control unit 409 and the image output unit 405 reset the respective built-in scanning surface counters (the main counter and the sub counter) to zero (0). Then, the main counter is incremented by one (1) each time a BD signal is received.

However, if the main counter has already reached the thinning number, the main counter is reset to zero (0) instead of being incremented by one (1) in response to the reception of a BD signal. At that time, the sub counter is incremented by one (1). The sub counter is reset to zero (0) instead of being incremented by one (1) when the count reaches the maximum number of the scanning surface control set number. Accordingly, the laser scanning surface can be in synchronization with the exposure control unit 409 and the image output unit 405.

In the following description, a case where the maximum number of the main counter is one (1) (thinning number is one), and the maximum number of the set number (n) of the scanning surface control of the sub counter is seven (7) will be described.

Operation of APC

The APC is a method for adjusting the amount of current supplied to the LD 107 at image output. According to the present exemplary embodiment, the APC is performed as described below.

First, the exposure control unit 409 obtains a reception timing of the BD signal based on the periodic reception of the BD signals. Next, just before the exposure control unit 409 receives the BD signal, the exposure control unit 409 outputs the SH1 signal and the Ldrv signal to the laser drive system circuit 130. Accordingly, the sample and hold circuit 102 in the laser drive system circuit 130 is put into the sample state. Further, the LD 107 is put into a light emission state by the Ldrv signal.

In this state, if the LD 107 is put into the whole surface light emission state, the PD 108 monitors the amount of light emission of the LD 107. Then, the monitor current Im which is in proportion to the amount of light emission is generated. Further, the current-voltage conversion circuit 109 generates the monitor voltage Vm by the monitor current Im flowing therethrough. Additionally, the current amplification circuit 104 controls the drive current Idrv based on the current Io1 flowing through the reference current source 105 so that the monitor voltage Vm is coincide with a first reference voltage Vref1 as the target voltage.

During the non-APC operation, in other words, when the normal image forming is performed, the sample and hold circuit 102 will be in the hold period (non-sampling period). The switching circuit 106 is turned ON/OFF according to the input signal Data, and pulse width modulation is applied to the drive current Idrv.

Operation of Printable Region

The VIDEO data is output at the scanning surface 0-(n) (latent image) and the scanning surface 1-(n) (n=0, 2, and 4) (weak exposure) according to the image output control performed by the image output unit 405. Further, the VIDEO data which is output at that time has the pulse waveform Vp based on the image data for the scanning surface 0-(n) or the pulse waveform Vbg based on the weak light emission for the weak light emission output scanning surface 1-(n) (n=0, 2, and 4).

As illustrated in FIG. 14, the pulse waveform Vbg is generally thinner than the pulse waveform Vp. The VIDEO data is not output at the scanning surface 1-(n) (n=1, 3, 5, 6, and 7). The amount of light emission of the LD 107 when the VIDEO data is output is the laser beam amount (TOTAL) illustrated in FIG. 14. The amount of light emission of the LD 107 according to the image data at that time is the laser beam amount (IMAGE), and the amount of light emission of the LD 107 according to the weak light emission is the laser beam amount (BG).

<Thinning of Image Output and Weak Light Emission Output>

Next, the thinning control of the image output and the weak light emission output according to the present exemplary embodiment will be described with reference to FIG. 14. FIG. 14 is a timing chart illustrating the thinning control according to the present exemplary embodiment.

The image forming apparatus according to the present exemplary embodiment has two speed options: a print speed of 1/1 and a slower speed of 3/8. When printing is performed at the print speed of 1/1, the latent image output and the weak light emission output are performed at all the scanning surfaces without thinning. When printing is performed at the print speed of 3/8, the polygonal mirror 203 is driven at a ratio of 3/4 with respect to the rotation speed of 1/1. Thus, the latent image output is thinned out on every other scanning surface. In other words, a single scan thinning output control in which the scanning surfaces are skipped alternately (i.e., the control to repeat "output, non-output, output, non-output" of the image with respect to laser scanning) is performed.

Since the rotation speed of the polygonal mirror 203 is reduced to 3/4, the time necessary for scanning one line will be increased by 4/3 times compared to the time necessary when the speed is 1/1. Therefore, if the light amount (light emission intensity) is unchanged from when the speed is 1/1, the quantity of light that illuminates the surface of the photosensitive drum 222 per unit area will be increased. Accordingly, overexposure occurs. Thus, compared to when the speed is 1/1, the amount of light emission for the latent image output is controlled so that it is 3/4 times the amount of light emission (light emission intensity) when the print speed is 3/8. In this manner, the printing at the print speed of 3/8 is realized.

The weak light emission output for printing at the print speed of 1/1 is an amount of weak light emission (light emission intensity) "a" per unit time with respect to the photosensitive drum 222. In FIG. 14, the/TOP signal is a signal associated with the start of writing of an image in the sub-scanning direction (i.e., the rotation direction of the photosensitive drum 122) with respect to page printing. In other words, the/TOP signal is the first timing signal of the latent image forming and also serves as a reference signal used for determining the laser scanning surface of the latent image output. The/BD signal is a signal associated with the start of writing of an image in the main-scanning direction (i.e., the axial direction of the photosensitive drum) with respect to page printing. In FIG. 14, the maximum number of the scanning surfaces is changed according to the thinning number. The scanning surface is managed by a counter which is initialized by the/TOP signal and counts up the/BD signals.

As described above, since the latent image output scanning surface is set to 0-(n) and a latent image non-output scanning surface is set to 1-(n), the image output unit 405 performs the latent image output at the scanning surfaces where the scanning surface counter is 0-(n). Further, regarding the weak light emission output, the image output unit 405 performs the weak light emission output at the scanning surfaces where the scanning surface counter is 1-(n) (n=0, 2, and 4). If the scanning surface counter exhibits a value other than 1-(n) (n=0, 2, and 4), which is a case where the counter exhibits 1-(n) (n=1, 3, 5, 6, and 7), 0-(n) (n=0 to 7), it is controlled that the drive current is not supplied to the LD 107.

In addition, based on information of the image forming speed, the pulse width modulation is controlled by the weak light emission data control unit 303 (weak light emission output adjustment means) so that the amount of weak light emission is "2a", which is twice the light emission amount compared to when the print speed is 1/1. Thus, the waveform of the pulse waveform Vbg will be thicker than the pulse waveform of the weak light emission output when the print speed is 1/1. Accordingly, a level of noise (unnecessary radiation) that occurs due to minute pulses can be decreased.

Next, a generalized description of the above-described control is given. First, two image forming modes based on different print speeds (processing speeds) are defined. The rotation speed of the photosensitive drum (photosensitive member) in a first mode is a first speed and is denoted by d1. The rotation speed of the photosensitive drum in a second mode is a second speed and is denoted by d2. The resolution of images in the first mode and the second mode are unchanged.

The ratio of the rotation speed d2 of the photosensitive drum in the second mode with respect to the rotation speed d1 of the photosensitive drum in the first mode is denoted by D (=d2/d1). Further, the ratio of a scanning speed p2 (rotation speed of polygonal mirror) in the second mode with respect to a scanning speed p1 in the first mode is denoted by P (=p2/p1).

The ratio of the number of used scanning surfaces s2 in the second mode with respect to the number of used scanning surfaces s1 in the first mode is denoted by S (=s2/s1). The number of used scanning surfaces is the number of scanning surfaces which are used while the polygonal mirror unit rotates one revolution. For example, when a four-facet polygonal mirror is used, if scanning is performed in the first mode without thinning the surfaces (the number of used scanning surfaces is four) and scanning is performed in the second mode by alternate thinning of the scanning surfaces (the number of used scanning surfaces is two), the ratio S will be 2/4.

If the ratio S=1/8 when the four-facet polygonal mirror is used, since the maximum number of scanning surfaces which can be used by one rotation is four, s1=0.5 and s2=4 are obtained as S=1/8=0.5/4. The number of scanning surfaces used in the first mode s1=0.5 means that one scanning surface is used while the polygonal mirror rotates two revolutions in the first mode.

At that time, if the resolution in the sub-scanning direction is fixed, the equation below can be obtained.

$$D = P \times S \qquad \text{equation (1)}$$

If the resolution needs to be maintained constant between two modes, when the speed of the photosensitive drum is reduced (D<1), the exposure frequency also needs to be reduced. In order to reduce the exposure frequency, the speed of the polygonal mirror needs to be reduced (P<1) and/or the number of used scanning surfaces needs to be reduced (S<1). According to the present exemplary embodiment, since D=3/8 and P=3/4, S=1/2 (=8/16) is used for the latent image output.

Further, the ratio of light emission intensity L2 in the second mode with respect to the light emission intensity L1 in the first mode is denoted as L (=L2/L1). If the scanning speed is increased, the time required in scanning one line will be reduced. Thus, in order to obtain a constant light amount (image density) for exposure of a unit area on the surface of the photosensitive drum in the first mode and the second mode, the condition below needs to be satisfied.

$$L=P \quad \text{equation (2)}$$

Thus, L=3/4 is obtained.

Next, the weak light emission output will be described.

Since the conditions D=3/8 and P=3/4 are unchanged in the weak light emission output, according to equation (1), S=1/2 and L=3/4 are obtained. Thus, the amount of light emission of the weak light emission output will be “a”×L=3a/4.

According to the present exemplary embodiment, by thinning more scanning surfaces, the amount of light emission of the weak light emission output is set to a value greater than the amount of light emission “a” at the speed of 1/1. The ratio of the number of scanning surfaces to be finally used in the second mode s2' when more scanning surfaces are thinned to the number of used scanning surfaces s2 obtained from equation (1) is denoted by S' (=s2'/s2). Further, the ratio of a final light emission intensity L2' in the second mode to the present light emission intensity L2 obtained from equation (2) is denoted by L' (=L2'/L2).

If D and P are unchanged, in order to obtain constant light amount for exposure on the unit area of the surface of the photosensitive drum, the equation below needs to be satisfied.

$$L'=1/S' \quad \text{equation (3)}$$

According to equation (3), if the amount of light emission is increased, the exposure frequency is reduced by reducing the number of used scanning surfaces. In the case of L2'=2a, since L'=2a/(3a/4)=8/3, S'=3/8 is obtained.

The ratio of the number of scanning surfaces to be finally used in the second mode to the number of used scanning surfaces in the first mode is the value obtained from s2'/s1=S×S'. According to the present exemplary embodiment, it is (1/2)×(3/8)=3/16.

If further thinning is not performed, as for the latent image output, since S'=1, if this value is substituted for equation (3), equation (2) is obtained.

According to the present exemplary embodiment, by determining values D, P, S, and S' so that the value of L'×L (=L2'/L1) is greater than 1, the waveform of the pulse waveform Vbg will be thicker than the pulse waveform for the weak light emission output when the print speed is 1/1. Accordingly, the level of noise that occurs due to minute pulses can be decreased.

Further, according to equations (1) to (3), for example, if it is set to D=1, P=1, and S=1, and L'=2 and S'=1/2 are given to satisfy equation (3), it can be set to L'×L=2 (L1=a, L2'=2a). In other words, this is similar to thinning one scanning surface and doubling the light emission intensity for the weak light emission output in the first mode where the surface thinning is not performed for the latent image output. In this manner, by thinning the scanning surfaces in the image forming mode where the print speed is 1/1, the light emission intensity can be increased compared to when the weak light emission output is performed without thinning the scanning surfaces.

The settings of the scanning surfaces for the latent image output and the weak light emission output and the scanning surface in the case of thinned output are not limited to the above-described examples so long as the above-described equations (1) to (3) are satisfied. For example, according to the above-described configurations, although the scanning surface for the latent image output is different from the scanning surface for the weak light emission output, both the latent image output and the weak light emission output can be performed on at least some of the scanning surfaces.

According to the present exemplary embodiment, the above-described image output scanning surface data is stored in the memory 407 of the engine controller 122, and the information is notified to the video controller 123 via a communication I/F. Further, since the scanning surface counter is provided for each of the exposure control unit 409 of the engine controller 122 and the image output unit 405 of the video controller 123, the image output control and the exposure control can be synchronized with respect to the scanning surface. However, if the video controller 123 and the engine controller 122 are configured as one IC, a counter is not necessarily provided for each controller.

According to the present exemplary embodiment, by controlling the light emission of the laser scanner 224, stable weak light emission output at a level similar to the level which is obtained when the thinned image output is not performed can be realized for the thinned image output by a simple method. Since a conflict between an output timing of a latent image and an output timing of weak light emission can be avoided, weak light emission can be stably performed regardless of the latent image. This is the advantage of the present exemplary embodiment over the first exemplary embodiment. Further, since the weak light emission output is performed while the scanning surfaces are thinned, weak light emission can be performed by a greater amount of light emission compared to the amount of light emission of the weak light emission which is performed at all scanning surfaces (without thinning the scanning surfaces) in the print mode of the print speed of 1/1. Accordingly, the level of noise which occurs due to minute pulses can be reduced.

Next, a fifth exemplary embodiment will be described. The points which are different from the second exemplary embodiment will be mainly described. The components and configuration according to the present exemplary embodiment are similar to those illustrated in FIGS. 1 to 3 and 8 and described according to the second exemplary embodiment. The point different from the second exemplary embodiment is that, as is with the third and the fourth exemplary embodiments, the weak light emission and the image output can be performed at the different scanning surfaces. Since other configurations are similar to those of the second exemplary embodiment, their descriptions are not repeated.

Further, according to the present exemplary embodiment, as is with the fourth exemplary embodiment, the number of thinned surfaces for the latent image output and the number of thinned surfaces for the weak light emission output are different.

<Laser Drive According to the Fifth Exemplary Embodiment>

Figure 15:
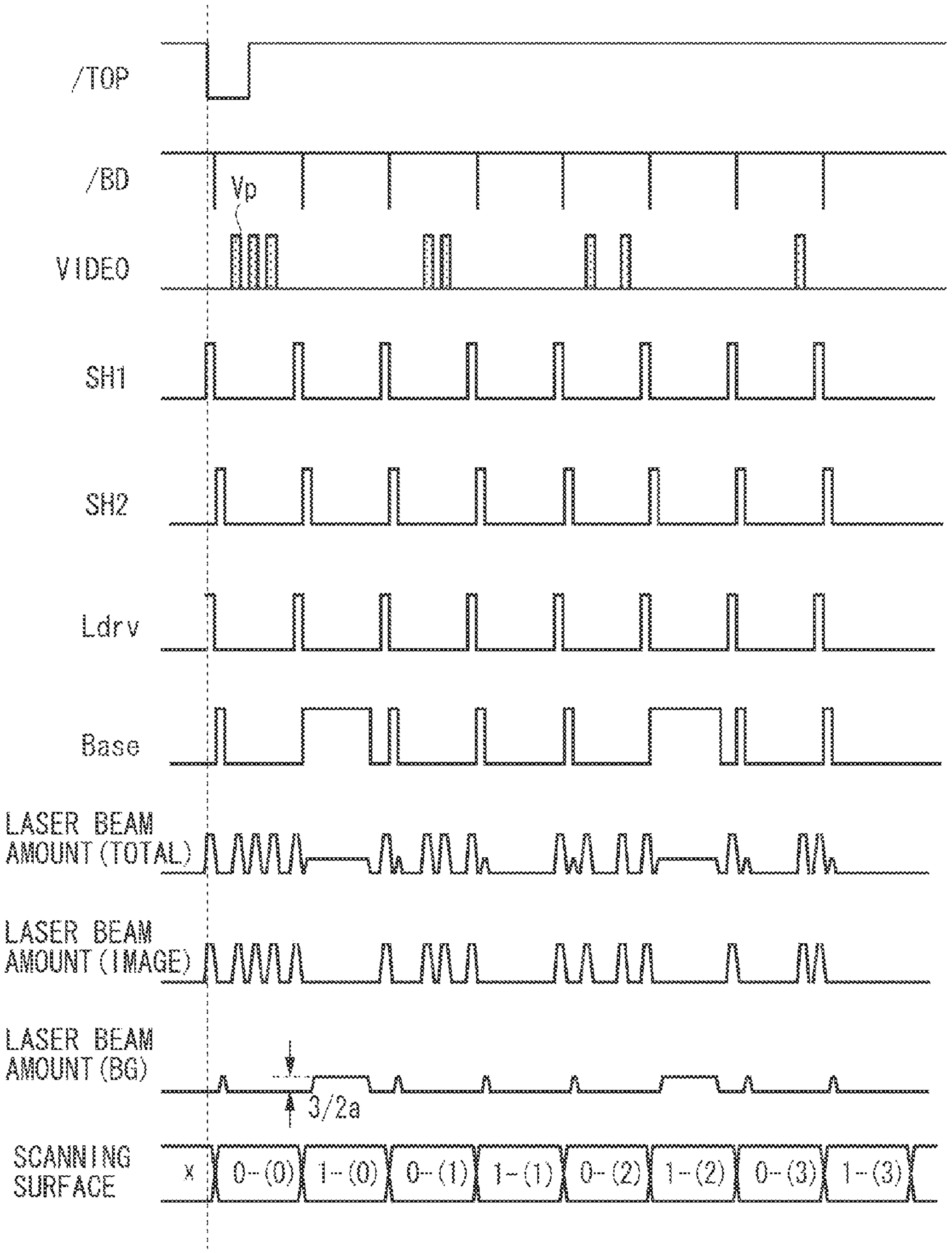
FIG. 15 is a timing chart illustrating relationships among laser control signals and amounts of laser beams.

The operation of the laser scanner 224 when the thinned image forming is performed according to the present exemplary embodiment will be described with reference to FIG. 8 and a timing chart in FIG. 15. FIG. 15 illustrates an example of the laser control signals and the amounts of laser in a case where the operation is performed by a printing method which performs thinning scan alternatively and when the scanning surface that outputs the latent image is set to zero (0) and the laser scanning surface that does not output the latent image is set to one (1). Although the amount of laser emission at image output and the amount of laser emission at weak light emission are not actually the amount of light emitted by the LD 107, they are illustrated in FIG. 14 for illustrative purposes.

Operation of Scanning Surface Determination Counter

The scanning surface counter according to the present exemplary embodiment includes a main counter and a sub counter. The main counter counts the scanning surface. The sub counter counts the number of times the main counter has been reset to zero (0) and thus counts the number (n) indicating the set number of the scanning surface control. For example, if the scanning surface is "0" and the scanning surface control set number is "3", it is expressed as "0-(3)".

If the exposure control unit 409 and the image output unit 405 (see FIG. 3) receive a BD signal when the TOP signal that notifies of the start of the page printing is "Low", that is, at the time of notification of the start of the image writing, the exposure control unit 409 and the image output unit 405 reset the respective built-in scanning surface counters (the main counter and the sub counter) to zero (0). Then, the main counter is incremented by one (1) each time a BD signal is received.

However, if the main counter has already reached the thinning number, the main counter is reset to zero (0) instead of being incremented by one (1) in response to the reception of a BD signal. At that time, the sub counter is incremented by one (1). The sub counter is reset to zero (0) instead of being incremented by one (1) when the count reaches the maximum number of the scanning surface control set number. Accordingly, the laser scanning surface can be in synchronization with the exposure control unit 409 and the image output unit 405.

In the following description, a case where the maximum number of the main counter is one (1) (thinning number is one), and the maximum number of the set number (n) of the scanning surface control of the sub counter is three (3) (n=0, 1, 2, and 3) will be described.

APC Operation for Image Data Light Emission

The engine controller 122 sets the sample and hold circuit 112 to the hold state (non-sampling period) according to the SH2 signal and sets the switching circuit 116 to the OFF state according to the input signal Base. Further, the engine controller 122 changes the state of the sample and hold circuit 102 to the sampling state according to the SH1 signal and turns ON the switching circuit 106 according to the input signal Data. More specifically, at that time, the engine controller 122 controls the Ldrv signal so that the input signal Data is set to a level that changes the LD 107 to the light emission state. The period the sample and hold circuit 102 is in the sampling state corresponds to the period of the APC operation.

In this state, if the state of the LD 107 is changed to the whole surface light emission state, the PD 108 monitors the amount of light emission of the LD 107. Then, the monitor current 1 ml which is in proportion to the amount of light emission is generated. Further, the current-voltage conversion circuit 109 generates the monitor voltage Vm1 from the monitor current 1 ml flowing therethrough. Additionally, the current amplification circuit 104 controls the drive current Idrv based on the current Io1 flowing through the reference current source 105 so that the monitor voltage Vm1 is coincide with the first reference voltage Vref11 as the target voltage.

During the non-APC operation, in other words, when the normal image forming is performed, the sample and hold circuit 102 will be in the hold period (non-sampling period). The switching circuit 106 is turned ON/OFF according to the input signal Data, and pulse width modulation is applied to the drive current Idrv.

APC Operation for Weak Light Emission

The engine controller 122 sets the sample and hold circuit 102 to the hold state (non-sampling period) according to the SH1 signal and sets the switching circuit 106 to the OFF state according to the input signal Data. According to the input signal Data, the engine controller 122 disables the Venb signal input to the enable terminal of the buffer 125, controls the Ldrv signal, and changes the input signal Data to the OFF state. Further, the engine controller 122 sets the sample and hold circuit 112 to the APC operation state according to the SH2 signal and turns ON the switching circuit 116 according to the input signal Base. Accordingly, the state of the LD 107 is changed to the state where the LD 107 emits light beams of weak light emission.

In this state, if the state of the LD 107 is changed to the whole surface weak light emission state (emission maintaining state) in low intensity, the PD 108 monitors the amount of light emission of the LD 107 and generates the monitor current Im2 (Im1>Im2) which is proportional to the amount of light emission. Then, the monitor voltage Vm2 is generated by the supply of the monitor current Im2 to the current-voltage conversion circuit 109. The current amplification circuit 114 controls the drive current Ib based on the current Io2 flowing through the reference current source 115 so that the monitor voltage Vm2 is coincide with the third reference voltage Vref21 as the target value.

During the non-APC operation, in other words, during the normal image forming operation (while the image signal is being transmitted), the sample and hold circuit 112 is in the hold period (non-sampling period), and the whole surface weak light emission in the low intensity state is maintained.

Operation of Printable Region

The latent image output is executed at the scanning surface 0-(n). In other words, the VIDEO data is output when the scanning surface 0-(n) (n=0, 1, 2, and 3) according to the image output control by the image output unit 405. At that time, the sample and hold circuit 102 is set to the hold state and the switching circuit 106 is turned ON/OFF according to the VIDEO signal.

Accordingly, when the VIDEO data is output, the drive current Idrv is supplied to the LD 107, and the pulse waveform of the VIDEO data at the scanning surface 0-(n) (n=0, 1, 2, and 3) is the pulse waveform Vp based on the image data. At the scanning surface 1-(n) (n=0, 1, 2, and 3), the latent image output is thinned, the VIDEO data is not output, and the supply of the drive current Idrv to the LD 107 is stopped. The amount of light emission of the LD 107 according to the image data will be the laser beam amount (image) illustrated in FIG. 15.

Regarding the scanning surface 1-(n) (n=0 and 2), the sample and hold circuit 112 is set to the hold state and the Base signal is controlled so that the switching circuit 116 is turned ON. Accordingly, the drive current Ib is supplied to the LD 107, and the weak light emission is performed. Regarding the scanning surface 0-(n) (n=0, 1, 2, and 3) and the scanning surface 1-(n) (n=1 and 3), the weak light emission output is thinned and the Base signal is controlled to be OFF so that the supply of the drive current Ib to the LD 107 is stopped. Accordingly, the LD 107 is turned OFF. The amount of weak light emission by the LD 107 is the laser beam amount (BG) illustrated in FIG. 15. Further, a total amount of light emission of the LD 107 corresponding to the latent image output and the weak light emission output is the laser beam amount (TOTAL) illustrated in FIG. 15.

<Thinning of Image Output and Weak Light Emission Output>

Next, the thinning control of the image output and the weak light emission output according to the present exemplary embodiment will be described with reference to FIG. 15. FIG. 15 is a timing chart illustrating the thinning control according to the present exemplary embodiment.

The image forming apparatus according to the present exemplary embodiment has two speed options: a print speed of 1/1 and a slower speed of 3/8. When printing is performed at the print speed of 1/1, the latent image output and the weak light emission output are performed at all the scanning surfaces without thinning. When printing is performed at the print speed of 3/8, the polygonal mirror 203 is driven at a ratio of 3/4 with respect to the rotation speed of 1/1. Thus, the latent image output is thinned out on every other scanning surface. In other words, printing at the print speed of 3/8 is realized by a single scan thinning output control in which the scanning surfaces are skipped alternately (i.e., the control repeats "output, non-output, output, non-output" of the image with respect to laser scanning). Further, the weak light emission output for printing at the print speed of 1/1 is an amount of weak light emission (light emission intensity) "a" with respect to the photosensitive drum 222.

In FIG. 15, the/TOP signal is a signal associated with the start of writing of an image in the sub-scanning direction (i.e., the rotation direction of the photosensitive drum 122) with respect to page printing. In other words, the/TOP signal is the first timing signal of the latent image forming and also serves as a reference signal used for determining the laser scanning surface of the latent image output. The/BD signal is a signal associated with the start of writing of an image in the main-scanning direction (i.e., the axial direction of the photosensitive drum) with respect to page printing. In FIG. 15, the maximum number of the scanning surfaces is changed according to the thinning number. The scanning surface is managed by a counter which is initialized by the/TOP signal and counts up the/BD signals.

As described above, the image output unit 405 performs the latent image output at the scanning surfaces that correspond to 0-(n) (n=0, 1, 2, and 3) of the scanning surface counter. Further, the image output unit 405 does not perform the latent image output at the scanning surfaces that correspond to 1-(n) (n=0, 1, 2, and 3) of the scanning surface counter. Furthermore, the image output unit 405 performs the weak light emission output at the scanning surfaces that correspond to 1-(n) (n=0 and 2) of the scanning surface counter and does not perform the weak light emission output at the scanning surfaces that correspond to 1-(n) (n=1 and 3) and 0(n) (n=0, 1, 2, and 3).

According to the present exemplary embodiment, the ratio D of the rotation speeds is 3/8 and the ratio P of scanning speeds is 3/4. Thus, S=1/2 is obtained. Regarding the weak light emission output, since the ratio of the scanning surfaces to be finally used is 1/4, the ratio of the scanning surfaces to be furthermore thinned is S'=1/2.

Thus, according to equation (3), L'=2 is obtained. Further, since L=3/4 is obtained according to equation (2), L'×L=3/2 is obtained. In other words, if the weak light emission is performed when the print speed is 3/8, the light emission intensity (amount of light emission) with respect to the photosensitive drum 222 will be "3/2a".

In this manner, by determining values D, P, S, and S' so that the value of L'×L is greater than 1, the intensity of the weak light emission can be increased and, accordingly, the weak light emission can be output more stably. In other words, the laser diode has the property that emits a light-emitting diode (LED) light when the drive current lower than a threshold current and emits a laser beam when the drive current is greater than the threshold current. Therefore, if the light emission intensity is small and the drive current Ib is small, since the variation of the light emission intensity is comparatively greater than the variation of the drive current Ib, the variation of the weak light emission output will also be increased. However, when the light emission intensity is increased, the weak light emission output can be increased. Thus, the electric potential of the non-image portion of the photosensitive drum 222, which is the portion where the toner is not attached to, can be stabilized.

The settings of the scanning surfaces for the latent image output and the weak light emission output and the scanning surface in the case of thinned output are not limited to the above-described examples so long as the above-described equation (1) is satisfied. For example, according to the above-described configurations, although the scanning surface for the latent image output is different from the scanning surface for the weak light emission output, both the latent image output and the weak light emission output can be performed on at least some of the scanning surfaces.

Further, according to equations (1) to (3), for example, it is possible to set D=1, P=1, S=1, S'=1/2, and L'×L=2. This is similar to thinning one scanning surface and doubling the light emission intensity for the weak light emission without changing the print speed (processing speed). In this manner, by thinning the scanning surfaces in the image forming mode where the print speed is 1/1, the light emission intensity can be increased compared to when the weak light emission output is performed without thinning the scanning surfaces. Further, the relationship of the above-described equation (1) is also satisfied with respect to the latent image output.

According to the present exemplary embodiment, the above-described image output scanning surface information is stored in the memory 407 of the engine controller 122, and the information is notified to the video controller 123 via a communication I/F. Further, since the scanning surface counter is provided for each of the exposure control unit 409 of the engine controller 122 and the image output unit 405 of the video controller 123, the image output control and the exposure control can be synchronized with respect to the scanning surface. If the video controller 123 and the engine controller 122 are configured as one IC, a counter is not necessarily provided for each controller.

According to the present exemplary embodiment, by controlling the light emission of the laser scanner 224, stable weak light emission output at a level similar to the level which is obtained when the thinned image output is not performed can be realized for the thinned image output by a simple method. Since a conflict between an output timing of a latent image and an output timing of weak light emission can be avoided, weak light emission can be stably performed regardless of the latent image. This is the advantage of the present exemplary embodiment over the first exemplary embodiment. Further, since the weak light emission output is performed while the scanning surfaces are thinned, the weak light emission can be performed by a greater amount of light emission compared to the amount of light emission of the weak light emission which is performed for all scanning surfaces in the print mode of the print speed of 1/1. Accordingly, the weak light emission can be output more stably.

Further, according to the first to the fifth exemplary embodiments described above, the laser scanner 224 that scans the photosensitive drum 222 in the main scanning direction (the axial direction of the photosensitive drum 222) using a rotating polygonal mirror is described as the light illumination unit. However, the light illumination unit according to an embodiment of the present invention is not limited to the above-described configuration. For example, the light illumination unit may be configures to illuminate a plurality of photosensitive drums 222 with light beams scanned by one rotating polygonal mirror. Further, the mirror in the light illumination unit is not limited to a rotating polygonal mirror and a mirror (mirror surface) which oscillates back and forth about the axis can also be used.

Further, the light illumination unit can be configured to include a plurality of light emitting elements (LEDs) which can independently emit light according to image data and are arranged in the main scanning direction for at least one line and to be able to form a line of an electrostatic latent image in the main scanning direction at once according to synchronization of the plurality of light emitting elements. In this case, instead of counting the scanning surface by the scanning surface counter, the main scanning line is counted and each light emitting element emits light selectively according to the weak light emission output or the latent image output for each main scanning line. In other words, the "scanning surface" in the timing charts illustrated in FIGS. 6, 7, 9, 11, 12, 14, and 15 can be replaced by "main scanning line". For example, regarding the timing chart in FIG. 11, the latent image output is performed when the "main scanning line" is "0" and the weak light emission is output when the "main scanning line" is "1".

As described above, in an embodiment of the present invention, the charge potential of each photosensitive drum can be appropriately controlled by a simplified configuration while corresponding to different process speeds.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Applications No. 2012-131290 filed Jun. 8, 2012 and No. 2013-099736 filed May 9, 2013, which are hereby incorporated by reference herein in their entirety.

What is claimed is:

1. An image forming apparatus comprising:

a photosensitive member;

a light illumination unit which includes a light emitting element and a rotating polygonal mirror including a plurality of mirror surfaces as scanning surfaces and is configured to reflect light emitted from the light emitting element from the scanning surfaces such that the photosensitive member which is charged is illuminated;

a development unit configured to form a toner image by attaching toner to a latent image formed on the photosensitive member illuminated by the light illumination unit; and a control unit configured to cause the light illumination unit to perform normal exposure of a first exposure amount such that the toner is attached to an imaging portion to which the toner is to be attached on the photosensitive member and cause the light illumination unit to perform weak exposure of a second exposure amount smaller than the first exposure amount such that the toner is not attached to a non-image portion to which the toner is not to be attached on the photosensitive member, wherein the light illumination unit performs the normal exposure by causing the light emitting element to emit light according to a pulse corresponding to image data and performs the weak exposure by causing the light emitting element to emit light according to a pulse with a narrower width than the pulse corresponding to the image data, wherein the control unit is capable of executing a first mode for forming a toner image on the photosensitive member that rotates at a first speed and a second mode for forming a toner image on the photosensitive member that rotates at a second speed slower than the first speed, and wherein, in the first mode, the control unit causes the light illumination unit to perform a weak exposure by serially using adjacent scanning surfaces of the rotating polygonal mirror, and wherein, in the second mode, the control unit causes the light illumination unit to perform a weak exposure during one rotation of the rotating polygonal mirror by only using a part of the plurality of scanning surfaces of the rotating polygonal mirror.

2. The image forming apparatus according to claim 1, wherein, in the first mode, the control unit causes the light illumination unit to perform a normal exposure by serially using the adjacent scanning surfaces of the rotating polygonal mirror, and wherein, in the second mode, the control unit causes the light illumination unit to perform a normal exposure during one rotation of the rotating polygonal mirror by only using a part of the plurality of scanning surfaces of the rotating polygonal mirror.

3. The image forming apparatus according to claim 2, wherein, in the second mode, the light illumination unit performs the weak exposure on the scanning surface where the normal exposure is performed among the scanning surfaces of the deflection scanning unit.

4. The image forming apparatus according to claim 2, wherein, in the second mode, the light illumination unit performs the weak exposure on the scanning surface other than the scanning surface on which the normal exposure is performed among the scanning surfaces of the deflection scanning unit.

5. The image forming apparatus according to claim 2, wherein, in the second mode, wherein a ratio of the scanning surface used for performing a weak exposure while the rotating polygonal mirror rotates once, and a ratio of the scanning surface used for performing a normal exposure while the rotating polygonal mirror rotates once, are different.

6. The image forming apparatus according to claim 1, wherein an amount of light emission of the light emitted from the light emitting element for the weak exposure in the second mode is greater than an amount of light emission of the light emitted from the light emitting element for the weak exposure in the first mode.

7. The image forming apparatus according to claim 1, further comprising a storage unit, wherein the control unit determines a scanning surface to be used for the weak exposure based on scanning surface data stored in the storage unit.

8. The image forming apparatus according to claim 7, wherein the control unit determines a scanning surface to be used for the normal exposure based on scanning surface data stored in the storage unit.

9. An image forming apparatus comprising:

a photosensitive member;

a light illumination unit which includes a light emitting element and a rotating polygonal mirror including a plurality of mirror surfaces as scanning surfaces and is configured to reflect light emitted from the light emitting element from the scanning surfaces of the deflection scanning unit such that the photosensitive member which is charged is illuminated;

a development unit configured to form a toner image by attaching toner to a latent image formed on the photosensitive member illuminated by the light illumination unit; and a control unit configured to cause the light illumination unit to perform normal exposure of a first exposure amount such that the toner is attached to an imaging portion to which the toner is to be attached on the photosensitive member and cause the light illumination unit to perform weak exposure of a second exposure amount smaller than the first exposure amount such that the toner is not attached to a non-image portion to which the toner is not to be attached on the photosensitive member, wherein the control unit causes the light illumination unit to perform a weak exposure by serially using adjacent scanning surfaces of the rotating polygonal mirror, and causes the light illumination unit to perform a weak exposure during one rotation of the rotating polygonal mirror by only using a part of the plurality of scanning surfaces of the rotating polygonal mirror.

10. The image forming apparatus according to claim 9, wherein the light illumination unit performs the normal exposure by causing the light emitting element to emit light according to a pulse corresponding to image data and performs the weak exposure by causing the light emitting element to emit light according to a pulse with a narrower width than the pulse corresponding to the image data.

11. The image forming apparatus according to claim 9, wherein the light illumination unit performs the normal exposure by supplying a first drive current to the light emitting element and causes the light emitting element to emit light, and performs the weak exposure by supplying a drive current obtained by adding the first drive current and a second drive current which is supplied according to image data to the light emitting element and causes the light emitting element to emit light.

12. An image forming apparatus comprising:

a photosensitive member;

a light illumination unit which includes a light emitting element and a rotating polygonal mirror including a plurality of mirror surfaces as scanning surfaces and is configured to reflect light emitted from the light emitting element from the scanning surfaces such that the photosensitive member which is charged is illuminated;

a development unit configured to form a toner image by attaching toner to a latent image formed on the photosensitive member illuminated by the light illumination unit; and a control unit configured to cause the light illumination unit to perform normal exposure of a first exposure amount such that the toner is attached to an imaging portion to which the toner is to be attached on the photosensitive member and cause the light illumination unit to perform weak exposure of a second exposure amount smaller than the first exposure amount such that the toner is not attached to a non-image portion to which the toner is not to be attached on the photosensitive member, wherein the light illumination unit performs the weak exposure by supplying a first current to the light emitting element and causes the light emitting element to emit light, and performs the normal exposure by supplying a drive current obtained by adding the first current and a second current which is supplied according to image data to the light emitting element and causes the light emitting element to emit light, wherein the control unit is capable of executing a first mode for forming a toner image on the photosensitive member that rotates at a first speed and a second mode for forming a toner image on the photosensitive member that rotates at a second speed slower than the first speed, and wherein, in the first mode, the control unit causes the light illumination unit to perform a weak exposure by serially using adjacent scanning surfaces of the rotating polygonal mirror, wherein, in the second mode, the control unit causes the light illumination unit to perform a weak exposure during one rotation of the rotating polygonal mirror by only using a part of the plurality of scanning surfaces of the rotating polygonal mirror, wherein the control unit executes an adjustment performance for adjusting the first current, and in the second mode, the control unit executes the adjustment performance on a scanning surface not to be used for performing the weak exposure.

13. The image forming apparatus according to claim 12, wherein, in the first mode, the control unit causes the light illumination unit to perform a normal exposure by serially using the adjacent scanning surfaces of the rotating polygonal mirror, wherein, in the second mode, the control unit causes the light illumination unit to perform a normal exposure during one rotation of the rotating polygonal mirror by only using a part of the plurality of scanning surfaces of the rotating polygonal mirror.

14. The image forming apparatus according to claim 13, wherein, in the second mode, the light illumination unit performs the weak exposure on the scanning surface where the normal exposure is performed among the scanning surfaces of the deflection scanning unit.

15. The image forming apparatus according to claim 13, wherein, in the second mode, the light illumination unit performs the weak exposure on the scanning surface other than the scanning surface on which the normal exposure is performed among the scanning surfaces of the deflection scanning unit.

16. The image forming apparatus according to claim 13, wherein, in the second mode, a ratio of the scanning surface used for performing a weak exposure while the rotating polygonal mirror rotates once, and a ratio of the scanning surface used for performing a normal exposure while the rotating polygonal mirror rotates once, are different.

17. The image forming apparatus according to claim 12, wherein an amount of light emission of the light emitted from the light emitting element for the weak exposure in the second mode is greater than an amount of light emission of the light emitted from the light emitting element for the weak exposure in the first mode.

18. The image forming apparatus according to claim 12, further comprising a storage unit, wherein the control unit determines a scanning surface to be used for the weak exposure based on scanning surface data stored in the storage unit.

19. The image forming apparatus according to claim 18, wherein the control unit determines a scanning surface to be used for the normal exposure based on scanning surface data stored in the storage unit.

* * * * *